(12) United States Patent
Park et al.

(10) Patent No.: US 9,372,540 B2
(45) Date of Patent: Jun. 21, 2016

(54) METHOD AND ELECTRONIC DEVICE FOR GESTURE RECOGNITION

(75) Inventors: Jong Soon Park, Seoul (KR); Junhee Yeo, Seoul (KR); Gu-Ang Jang, Seoul (KR)

(73) Assignee: LG Electronics Inc., Seoul (KR)

( * ) Notice: Subject to any disclaimer, the term of this patent is extended or adjusted under 35 U.S.C. 154(b) by 478 days.

(21) Appl. No.: 13/259,006

(22) PCT Filed: Apr. 19, 2011

(86) PCT No.: PCT/KR2011/002793
§ 371 (c)(1),
(2), (4) Date: Sep. 22, 2011

(87) PCT Pub. No.: WO2012/144667
PCT Pub. Date: Oct. 26, 2012

(65) Prior Publication Data
US 2012/0268372 A1 Oct. 25, 2012

(51) Int. Cl.
*G06F 3/041* (2006.01)
*G06F 3/01* (2006.01)
*G06F 3/03* (2006.01)

(52) U.S. Cl.
CPC .............. *G06F 3/017* (2013.01); *G06F 3/0304* (2013.01); *G06F 2203/0381* (2013.01); *G06F 2203/04803* (2013.01)

(58) Field of Classification Search
CPC .......... G06F 3/017; G06F 2203/04808; G06F 3/0488; G06F 3/011; G06F 3/0304; G06F 3/0425; G06F 3/04883; G06F 17/30247; G06F 17/30268; G06F 21/32; G06F 2203/04104; G06F 3/01; G06F 3/012; G06F 3/0325
See application file for complete search history.

(56) References Cited

U.S. PATENT DOCUMENTS

| 6,283,860 B1 * | 9/2001 | Lyons et al. ..................... 463/36 |
| 2007/0120832 A1 * | 5/2007 | Saarinen et al. ............... 345/173 |
| 2011/0197263 A1 * | 8/2011 | Stinson, III ....................... 726/4 |

FOREIGN PATENT DOCUMENTS

| KR | 10-2002-0093910 A | 12/2002 |
| KR | 10-0692526 B1 | 3/2007 |
| KR | 10-2011-0032429 A | 3/2011 |
| WO | WO 03/003728 A1 | 1/2003 |

* cited by examiner

*Primary Examiner* — Jonathan Boyd
(74) *Attorney, Agent, or Firm* — Birch, Stewart, Kolasch & Birch, LLP

(57) ABSTRACT

Provided are a method and an electronic device for gesture recognition capable of dividing a display into a plurality of display regions assigned to a plurality of users, recognizing gestures of the plurality of users, and controlling the display regions assigned to the users who have made a gesture according to the recognized gestures. The method for gesture recognition includes: dividing a display into a plurality of display regions assigned to a plurality of users; recognizing gestures made by the plurality of users, respectively; and controlling the plurality of display regions respectively assigned to the plurality of users who have made the gestures according to the respective recognized gestures.

32 Claims, 23 Drawing Sheets

Fig. 12
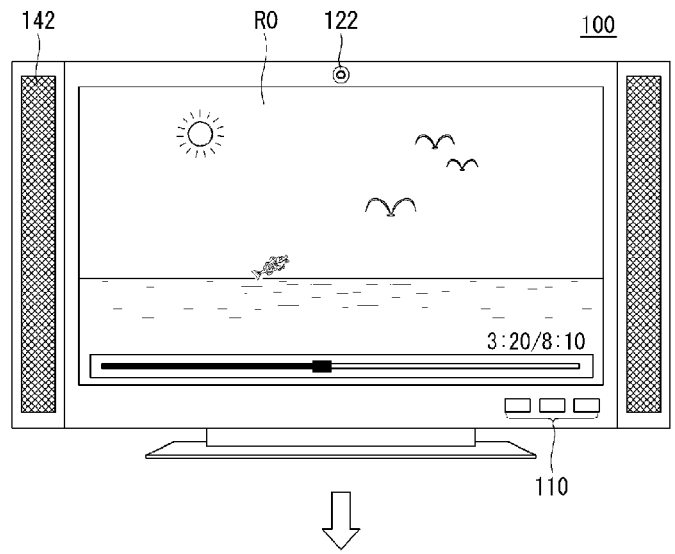
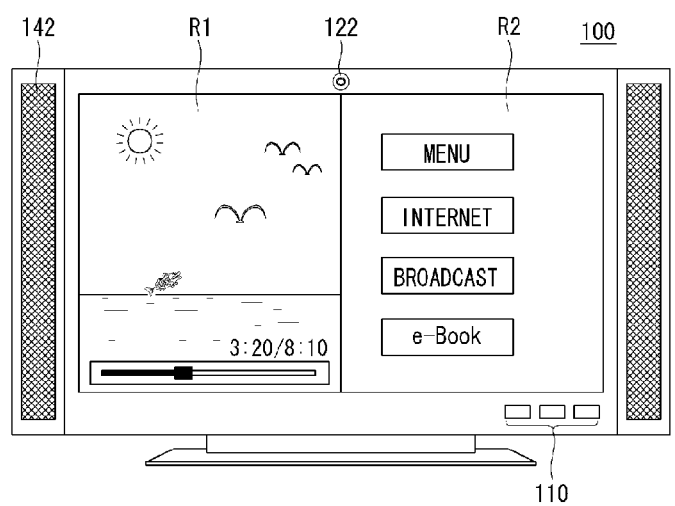
Fig. 13
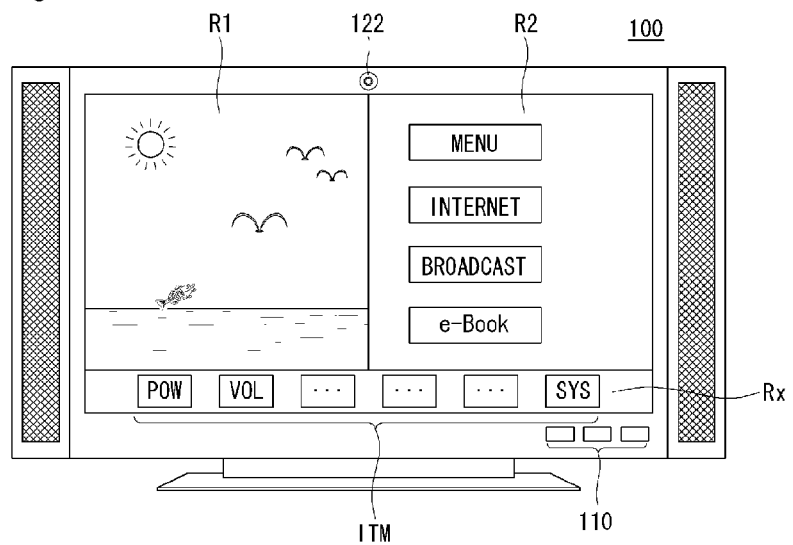

Fig. 18
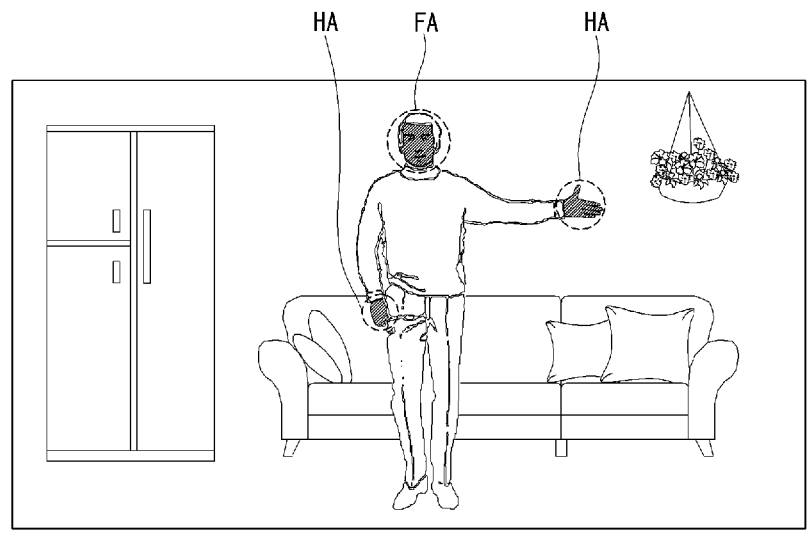
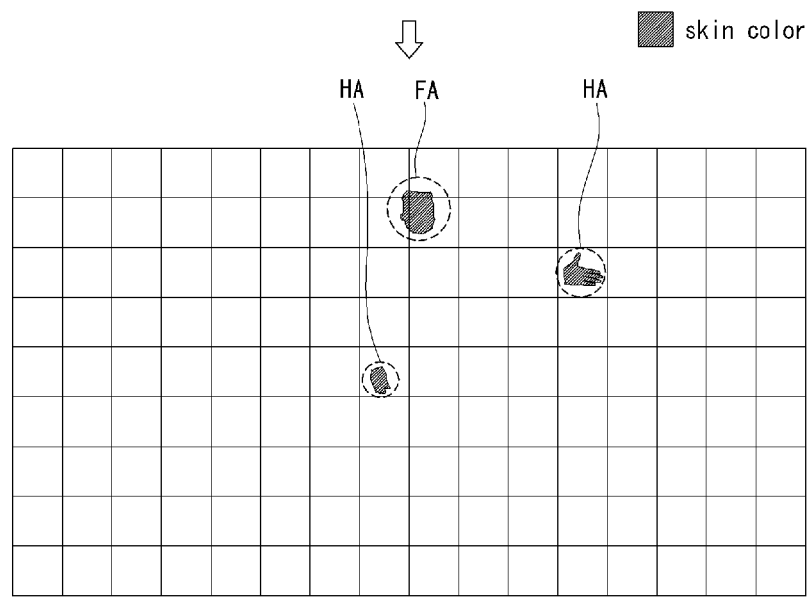
Fig. 19
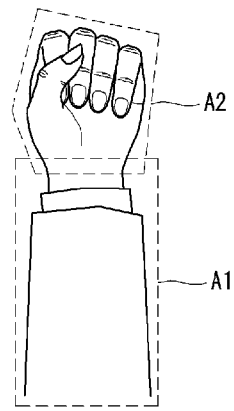

METHOD AND ELECTRONIC DEVICE FOR GESTURE RECOGNITION

This application is a National Stage of PCT Application No. PCT/KR2011/002793, filed on Apr. 19, 2011, the disclosure of which is incorporated by reference herein.

BACKGROUND OF THE INVENTION

1. Field of the Invention

The embodiments of the invention relate to a method and an electronic device for gesture recognition and, more particularly, to a method and electronic device for gesture recognition capable of dividing a display into a plurality of display regions assigned to a plurality of users, recognizing gestures of the plurality of users, and controlling the display regions assigned to the users who has made a gesture according to the recognized gestures.

2. Description of the Related Art

Conventionally, electronic devices generally provide only a specified function, but the gradual advancement of techniques has enabled electronic devices to provide various functions, and in line with this, the importance of user interfaces (UI) allowing users to easily use the electronic devices having various, complicated functions is increasing.

Recently, a gesture-based UI allowing for a manipulation of electronic devices only with a user's gesture without an input device has emerged as a core technology field. With this trend, research into gesture-based UIs capable of simultaneously recognizing several users' gestures to allow the users to use a single electronic device is actively ongoing.

SUMMARY OF THE INVENTION

It is, therefore, an object of the invention to provide a method and an electronic device for gesture recognition capable of dividing a display into a plurality of display regions and providing contents desired by a plurality of users to the plurality of display regions.

Another object of the invention is to provide a method and an electronic device for gesture recognition capable of allowing a plurality of users to control a plurality of divided display regions, separately.

Another object of the invention is to provide a method and an electronic device for gesture recognition capable of automatically changing an overall screen mode and a divided screen mode according to the number of users who use an electronic device.

Another object of the invention is to provide a method and an electronic device for gesture recognition capable of providing proper contents to a user according to a change between an overall screen mode and a divided screen mode.

Technical ideas devised by the invention are not limited to those described above and any other technical ideas not mentioned could be clearly understood by a person skilled in the art to which the invention pertains from the following description.

According to an aspect of the invention, there is provided an electronic device including: a camera; a display; and a controller configured to divide the display into a plurality of display regions assigned to a plurality of users, respectively, recognize gestures made by the plurality of users from an image captured by the camera, and control the plurality of display regions respectively assigned to the plurality of users who has made the gestures.

According to another aspect of the invention, there is also provided an electronic device including: a camera; a display; and a controller configured to determine locations of a plurality of users from an image captured by the camera, divide the display into a plurality of display regions assigned to the plurality of users according to the locations of the plurality of users, recognize gestures made by the plurality of users from the image captured by the camera, and control the display regions assigned to the users who have made the gestures according to the gestures.

According to another aspect of the invention, there is also provided an electronic device including: a camera; a display configured to provide particular contents to an entire screen; and a controller configured to divide the display into a plurality of display regions assigned to a plurality of users when a pre-set event occurs while the particular contents is being provided to the entire screen of the display, continuously provide the particular contents to one of the plurality of display regions, recognize gestures made by the plurality of users from an image captured by the camera, and control the display regions assigned to the users who have made the gestures according to the gestures.

According to another aspect of the invention, there is also provided an electronic device including: a camera; a display; and a controller configured to divide the display into a plurality of display regions assigned to a plurality of users, recognize gestures made by the plurality of users from an image captured by the camera, and control the display regions assigned to the users who have made gestures according to the gestures. In this instance, the controller displays a plurality of cursors at coordinates corresponding to the locations of the plurality of users' hands through the display when the coordinates of the cursors are within the display regions assigned to the users corresponding to the cursors.

According to another aspect of the invention, there is also provided an electronic device including: a camera; a display; and a controller configured to divide the display into a plurality of display regions assigned to the plurality of users, recognize gestures made by the plurality of users from an image captured by the camera, identify (or recognize) users who have made gestures from the image, determine display regions assigned to the users who have made the gestures based on the identification results, and control the display regions according to the determination results based on the gestures.

According to another aspect of the invention, there is also provided an electronic device including: a camera; a display; and a controller configured to divide the display into a plurality of display regions assigned to the plurality of users, recognize gestures made by the plurality of users from an image captured by the camera, control display regions assigned to the users who bade made the gestures according to the gestures, and release the divided state of the display when a pre-set event occurs while the display is in a divided state.

According to another aspect of the invention, there is also provided an electronic device including: a camera; a display; and a controller configured to divide the display into a plurality of display regions assigned to the plurality of users, recognize gestures made by the plurality of users from an image captured by the camera, control display regions assigned to the users who bade made the gestures according to the gestures, and release the divided state of the display when only one user is included in the image captured by the camera while the display is in the divided state.

According to another aspect of the invention, there is also provided an electronic device including: a camera; a display; and a controller configured to divide the display into first and second display regions, recognize gestures of first and second users through the camera, control first contents displayed on the first display region according to the first user's gesture, and control second contents displayed on the second display region according to the second user's gesture.

According to another aspect of the invention, there is also provided a method for gesture recognition including: dividing a display into a plurality of display regions assigned to a plurality of users; recognizing gestures made by the plurality of users, respectively; and controlling the display regions assigned to the users who have made the gestures according to the recognized gestures.

According to another aspect of the invention, there is also provided a method for gesture recognition including: determining the locations of a plurality of users; dividing a display into a plurality of display regions assigned to the plurality of users according to the locations of the plurality of users; recognizing gestures made by the plurality of users; controlling the display regions assigned to the users who have made gestures according to the recognized gestures; and when a pre-set event occurs while the display is in a divided state, releasing the divided state of the display.

According to another aspect of the invention, there is also provided a method for gesture recognition including: dividing a display into first and second display regions; recognizing gestures of the first and second users; and controlling contents displayed on the first display region according to the first user's gesture and controlling contents displayed on the second display region according to the second user's gesture.

According to an example embodiment of the invention, since the display is divided to provide a plurality of display regions, a single electronic device can provide contents desired by a plurality of users, respectively.

According to an example embodiment of the invention, since each of divided display regions is controlled according to the gesture of each of users who have the authority to control the display region, the users can simultaneously use the single electronic device through the display regions assigned to them and perform an operation, respectively.

According to an example embodiment of the invention, since an electronic device automatically changes an entire screen mode and a divided screen mode according to the number of users who use the electronic device, it can provide an appropriate usage environment to the users.

According to an example embodiment of the invention, when a mode is changed (or when there is a change between modes), contents previously used by a user is continuously provided, allowing the user to conveniently use the desired contents.

Effects of the invention are not limited to those described above and any other effects not mentioned could be clearly understood by a person skilled in the art to which the invention pertains from the following description.

BRIEF DESCRIPTION OF THE DRAWINGS

The above and other objects and features of the invention will become apparent from the following description of example embodiments given in conjunction with the accompanying drawings, in which:

FIG. 12 is a view illustrating contents continuously provided in the method for gesture recognition according to the first example embodiment of the invention.

FIG. 13 is a view illustrating a common control region in the method for gesture recognition according to the first example embodiment of the invention.

FIG. 18 is a view illustrating a detection of a hand region using a skin color in the method for gesture recognition according to the first example embodiment of the invention.

FIG. 19 is a first view illustrating a detection of a hand region using a hand shape in the method for gesture recognition according to the first example embodiment of the invention.

DETAILED DESCRIPTION OF THE EMBODIMENTS

Figure 1:
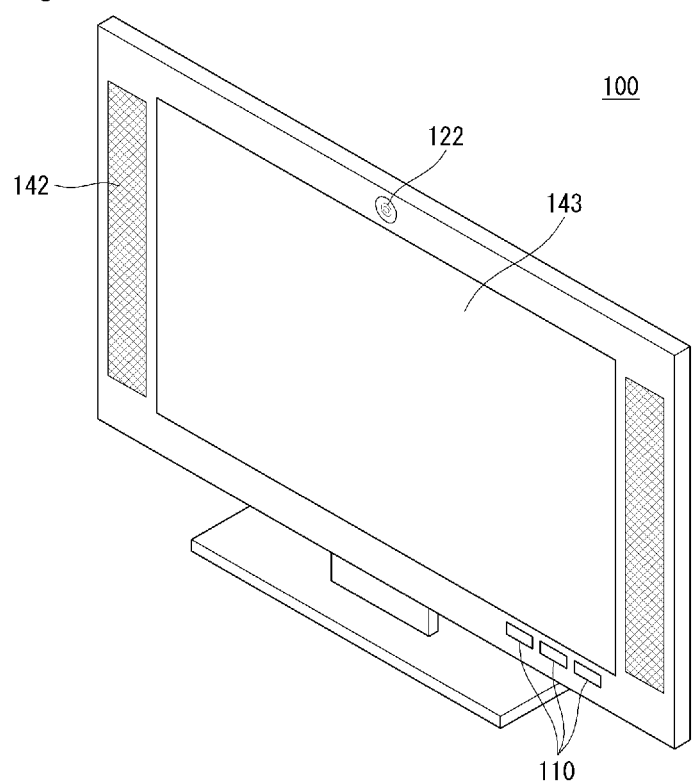
FIG. 1 is a perspective view of an electronic device according to an example embodiment of the invention.

Terms used in this specification are used to easily describe the invention. Accordingly, the invention is not limited to the terms used in this specification.

From among the terms used in this specification, a term, such as "connect" or "couple", does not necessarily refer to a direct connection or coupling, but is a concept including indirect connection or coupling through a medium. Furthermore, terms, such as a "module" ad a "unit", are used for convenience of description, and they do not have different meanings or functions in themselves.

The embodiments of the invention may be modified or changed without departing from the spirit and scope of the invention. The modifications or changes made without departing from the spirit and scope of the invention are evident to a person having ordinary skill in the art to which the invention pertains. Accordingly, the invention includes modification examples or change examples without departing from the spirit and scope of the invention. Furthermore, the invention is not limited to the following embodiments.

An electronic device 100 described in this specification may include television, digital television (DTV), Internet protocol television (IPTV), a mobile phone, a smart phone, personal digital assistants (PDAs), a portable multimedia player (PMP), a personal computer (PC), a laptop computer, a tablet computer, a digital broadcast terminal, a mobile communication terminal, a navigator, and electronic devices which are evident to a person having ordinary skill in the art to which the invention pertains.

The invention will now be described with reference to the accompanying drawings. The drawings are shown to help understanding of the invention, and the technical spirit of the invention is not limited to the accompanying drawings. Meanwhile, the same reference numerals are used to identify the same elements in the drawings, and a redundant description may be omitted for simplicity.

The electronic device 100 according to the invention is described below with reference to FIGS. 1 and 2. FIG. 1 is a perspective view relating to an embodiment of the electronic device 100 according to the invention, and FIG. 2 is a block diagram of the electronic device 100 according to an embodiment of the invention.

The electronic device 100 may divide the display into a plurality of display regions and assign the plurality of display regions to users, respectively, to allow the plurality of users to simultaneously use the electronic device 100. The electronic device 100 may divide the display into the plurality of display regions assigned to the plurality of users, recognize the plurality of users' gestures, and control the display regions assigned to the users who have made the gestures according to the gestures made.

Figure 2:
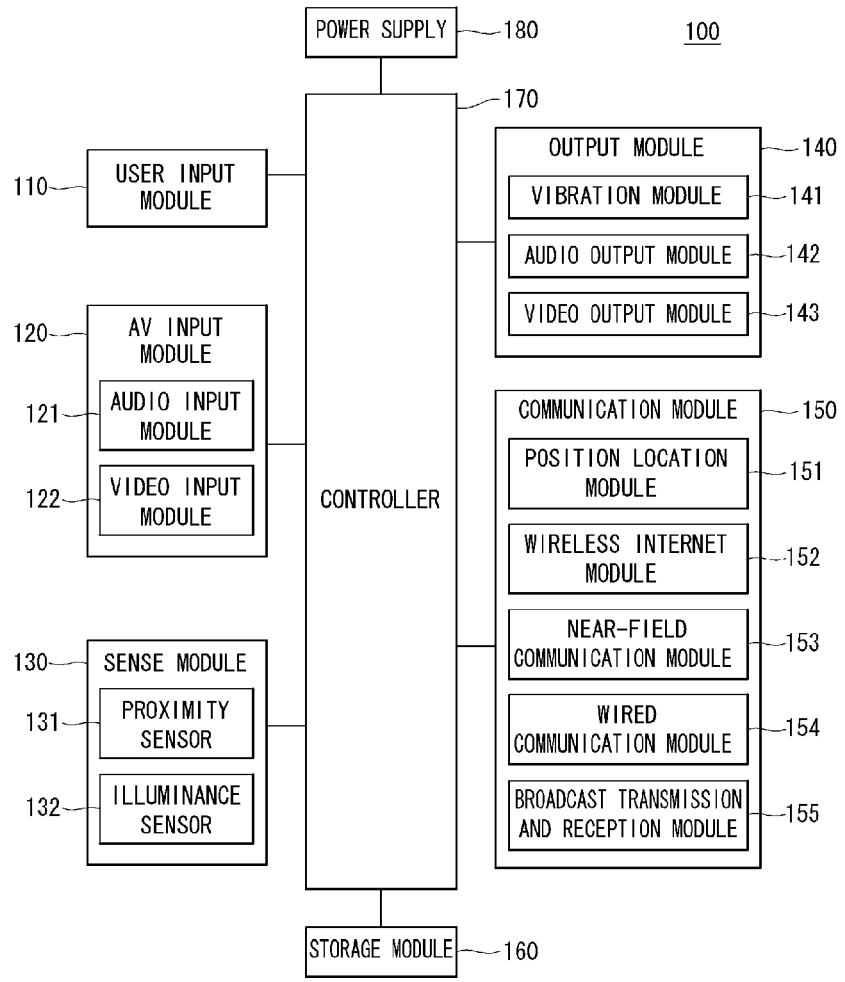
FIG. 2 is a block diagram of the electronic device according to an example embodiment of the invention.

The electronic device 100, as shown in FIGS. 1 and 2, may comprise at least one of a user input module 110 for receiving input from a user, an audio/video (AV) input module 120 for obtaining audio information and video information, a sense module 130 for sensing various states, an output module 140 for outputting information, a communication module 150 for performing communication, a storage module 160 for storing information, a controller 170 for controlling the entire operation of the electronic device 100, and a power supply module 180 for supplying power to the electronic device 100.

In the electronic device 100 according to the invention, the above elements are not indispensable, and the electronic device 100 need not comprise all the above elements. In other words, the electronic device 100 according to the invention may selectively comprise the above elements.

The elements of the electronic device 100 are described below with reference to FIG. 2 in order of the user input module 110, the AV input module 120, the sense module 130, the output module 140, the communication module 150, the storage module 160, the controller 170, and the power supply module 180.

The user input module 110 can receive input from a user. A user may directly manipulate the operation of the electronic device 100 using the user input module 110. The user input module 110 may include at least one of a keypad, a dome switch, a jog wheel, a jog switch, a touch pad, and other input devices which are evident to a person having ordinary skill in the art to which the invention pertains.

The AV input module 120 can obtain at least one of audio information and video information. The AV input module 120 may include at least one of an audio input module 121 for obtaining audio information and a video input module 122 for obtaining video information.

The audio input module 121 can obtain audio information. For example, the audio input module 121 may be implemented using a microphone and configured to receive an external audio signal and obtain audio information by electrically processing the received audio signal. For another example, the audio input module 121 may be implemented using an interface for receiving an external audio signal, such as a broadcast signal, and configured to obtain audio information.

Meanwhile, the audio input module 121 may perform a noise cancellation algorithm for canceling noise generated in a process of receiving an external audio signal.

The audio information obtained by the audio input module 121 as described above may be outputted through the output module 140, such as a speaker, externally transmitted through the communication module 150, or stored in the storage module 160.

The video input module 122 can obtain video information. The video information obtained by the video input module 122 may be outputted through the output module 140, such as a display, externally transmitted through the communication module 150, or stored in the storage module 160.

The video input module 122 may be implemented using a camera or an interface for receiving an external image signal.

The camera can obtain video information, such as a still image or a moving image, in response to an optical signal. In this instance, the optical signal may include not only a visible ray, but also infrared rays or ultraviolet rays that are not seen by the naked eye.

The camera may be implemented using at least one of a 2-D (2-D) camera and a 3-D (3-D) camera.

The 2-D camera can receive external light, obtain brightness information or color information based on the received light, and obtain a 2-D image based on the brightness information or color information. For example, the 2-D camera may obtain video information based on light received through an image sensor which is implemented using a charge coupled device (CCD) or a complementary metal oxide semiconductor (CMOS) device.

The 3-D camera can receive external light, obtain depth information based on the received light, and obtain a 3-D image, such as a depth image reflecting the depth information.

The 3-D camera can radiate light to a subject, receive light reflected and returned from the subject, and obtain depth information about distance from the subject in real time based on the received light using a depth sensor. Furthermore, the 3-D camera can obtain an intensity image according to the intensity or strength of light returned together with a depth image. The intensity image is an image, reflecting not only distance from an object, but also information according to states, such as the color, temperature, and brightness of the object. The intensity image can be more easily identified by a user than a depth image.

The 3-D camera may include at least one of a stereo camera, a time of flight (TOF) camera, a structured light camera, and other image obtaining devices which are evident to a person having ordinary skill in the art to which the invention pertains.

The TOF camera is a camera for obtaining depth information based on a TOF principle. The TOF camera can radiate infrared rays or a laser having a short pulse using a light emitting diode (LED), receive returned light, calculate a difference between the radiated light and light returned and received through a TOF sensor, and obtain depth information by sensing distance from a subject. In this instance, the TOF camera may calculate returned time on the basis of a phase difference between the radiated light and the received light.

A method of directly obtaining depth information through the 3-D camera is advantageous in that a complicated operation is not required and error is small, as compared with an indirect method of obtaining depth information using computer vision technology from a plurality of 2-D images.

The sense module 130 can sense various states. The sense module 130 may include a proximity sensor 131 and an illuminance sensor 132.

The proximity sensor 131 can detect an object approaching a specific detection surface or whether an object exists nearby. The proximity sensor 131 can detect whether an object exists using electrical and optical signals for a detection surface. The proximity sensor 131 may have a longer lifespan and greater utilization than a contact sensor because it is not dependent on a mechanical contact.

The proximity sensor 131 may include a transmission type photoelectric sensor, a direct reflection type photoelectric sensor, a mirror reflection type photoelectric sensor, a high frequency oscillation type proximity sensor, a capacitance type proximity sensor, a magnetic type proximity sensor, and an infrared proximity sensor.

The illuminance sensor 132 can measure illuminance around the electronic device 100. The electronic device 100 may control surrounding brightness of a display according to illuminance measured by the illuminance sensor 132.

The output module 140 can output information. The electronic device 100 can provide a user with various pieces of information through the output module 140.

The output module 140 can output information in the form of at least one of a tactile signal, an aural signal, and a visual signal. The output module 140 may include at least one of a display, a speaker, a vibrator, and other output devices which are evident to a person having ordinary skill in the art to which the invention pertains.

The output module 140 may include at least one of a vibration module 141, an audio output module 142, and a video output module 143.

The vibration module 141 can output a tactile signal. The vibration module 141 can generate a vibration felt by a user. In this instance, the vibration module 141 can generate various pieces of the vibration by controlling the intensity and pattern of vibration.

The vibration module 141 can generate a tactile signal according to the movement of a pin array vertically moving against a contact skin surface, a tactile signal according to a jet power or suction power of air via an outlet or an inlet, a tactile signal on a skin surface, a tactile signal according to a contact of an electrode, a tactile signal using electrostatic power, a tactile signal according to hot/cold sense reproduction using an endothermic or exothermic device as well as the vibration.

The vibration module 141 may generate not only a tactile signal transferred through a direct contact, but also a tactile signal transferred via muscular sense of a finger or an arm of a user.

The audio output module 142 can output an aural signal (that is, an audio signal). For example, the audio output module 142 may output an audio signal based on audio information which is received from the communication module 150 or stored in the storage module 160. For another example, the audio output module 142 may output audio signals pertinent to various functions performed by the electronic device 100.

The audio output module 142 may be implemented using a receiver, a speaker, or a buzzer. For example, the audio output module 142 may output audio through earphones connected to an earphone jack.

The video output module 143 can output a visual signal. The video output module 143 can display video information.

For example, the video output module 143 may display a user UI or a graphic user interface (GUI).

The video output module 143 may be implemented using at least one of a liquid crystal display (LCD), a thin film transistor liquid crystal display (TFT LCD), an organic light-emitting diode (OLED) display, a flexible display, a 3-D display, and other displays which are evident to a person having ordinary skill in the art to which the invention pertains.

The display may be a transparent or light-transmitting display made of a material that transmits light. A representative example of the transparent display that transmits light includes a transparent LCD. The back structure of the transparent display may also have a light-transmitting structure. A user can see things placed in the rear of the electronic device 100 through the transparent display.

The video output module 143 need not be implemented using a single display, but may be implemented using a plurality of displays. For example, the video output module 143 may be implemented using displays which are spaced apart from each other or integrally disposed on one face or displays which are disposed in different faces.

Furthermore, the video output module 143 need not be implemented using a display, but may be implemented using a projector for providing an image by scanning light on a screen or providing a hologram 3-D image.

Meanwhile, the output module 140 and the user input module 110 may be integrally implemented using one device.

For example, the output module 140 and the user input module 110 may be implemented using a touch screen for displaying information and simultaneously receiving touch input. The touch screen may include a display for displaying information and a touch panel for sensing touch input, which are disposed to form a layer. In this instance, the touch panel can detect at least one of the position on which touch input is performed, a touched area, and the strength of the touch by detecting the touch input.

The touch panel may be classified into various kinds according to methods of sensing the touch input. The types of the touch panel may include a resistive type (decompression type) touch panel, an ultrasonic reflective type touch panel, a capacitive type touch panel, and an infrared optical type touch panel.

The resistive type touch panel may be provided by disposing two substrates on which an ITO metal layer is coated between dot spacers so that they face each other. In the resistive type touch panel, touch input according to a contact can be detected through an upper substrate, and a touched position can be detected through a lower substrate.

The capacitive type touch panel may be implemented using a substrate configured to have special conductive metal (for example, tin antimony oxide (TAO)) coated thereon and operated as a transparent electrode so that a certain amount of current flows on the surface of the substrate. When a user performs touch input on the capacitive type touch panel, current flowing on the surface of the substrate is changed by capacitance in the body of the user. The capacitive type touch panel can detect a touched position by detecting a change in the amount of current.

According to the above-described principle, the touch screen can display information and simultaneously receive touch input.

The communication module 150 can perform communication. The communication module 150 can send and receive information by performing communication with an external device.

The communication module 150 may include at least one of a position location module 151, a wireless Internet module 152, a near-field communication module 153, a wired communication module 154, and a broadcast transmission and reception module 155.

The position location module 151 can obtain position information.

The position location module 151 may obtain position information using a global navigation satellite system (GNSS). The GNSS is a system configured to include navigation satellites revolving around the earth and a navigation receiver for receiving satellite electric waves (e.g., radio signals or other electromagnetic waves) from the navigation satellites and calculating position information about their specific locations on the surface of the earth or near the surface of the earth and to obtain position information. The GNSS may include a global position system (GPS) operated by U.S.A, Galileo operated by Europe, a global orbiting navigational satellite system (GLONASS) operated by Russia, COMPASS operated by China, an Indian regional navigation satellite system (IRNS) operated by India, a quasi-zenith satellite system (QZSS) operated by Japan, and so on.

Accordingly, the position location module 151 may be, for example, a GPS module corresponding to each GNSS. The position location module 151 can receive satellite electric waves, including identification information and time information about three or more navigation satellites, from the navigation satellites. The position location module 151 can calculate distance from a specific location to each of the navigation satellites based on the identification information and time information of the navigation satellites and the time that the satellite electric waves take to reach the specific location. The position location module 151 can calculate 3-D position information about the specific location based on the calculated distance and time. The 3-D position information may be represented by latitude, longitude, and an altitude.

However, the position information does not need to directly reflect the position as if it is represented by coordinate values for a specific location. In a broad sense, the position information may include satellite electric waves which are transmitted by navigation satellites in the GNSS.

In the instance where satellite electric waves transmitted by a larger number of navigation satellites are used, the position location module 151 may correct position information using excessive satellite electric waves.

Furthermore, the position location module 151 may calculate the moving speed according to a change in the position information according to time.

Meanwhile, the position location module 151 need not independently calculate all the pieces of position information, and some or all of the pieces of position information using satellite electric waves may be calculated by the controller 170 or an external device. For example, when the position location module 151 receives satellite electric waves from the GNSS and sends information, included in the satellite electric waves, to an external device through the communication module 150, the external device may generate position information based on the received information and send the generated position information back to the electronic device 100.

The position location module 151 may obtain position information using the GNSS and also obtain position information through triangular measurement using a communication signal by communicating with a mobile phone base station.

In some embodiments, the position location module 151 may obtain position information based on the position of an access point (AP) by communicating with the AP over a near-field communication network.

Meanwhile, the electronic device 100 may correct obtained position information. The position location module 151 or the controller 170 may correct the position information using a map matching scheme. The position location module 151 or the controller 170 may correct obtained position information by checking a place corresponding to the position information using map data stored in the storage module 160.

For example, when a place according to first calculated position information is a place that one cannot enter, such as a river, the position location module 151 or the controller 170 may correct the position information using coordinates corresponding to a place that one can enter and is close to the river.

The Internet module 152 is a device for accessing the Internet in a wired or wireless manner and transmitting and receiving information. The Internet module 152 can access the Internet and transmit and receive various pieces of information. The Internet module 152 may be internal or external to the electronic device 100 or may be attached to or detached from the electronic device 100.

The Internet module 152 can access the Internet in a wired or wireless manner and perform communication in accordance with at least one of local area network (LAN), wireless LAN (WLAN), Wibro wireless broadband, Wimax world interoperability for microwave access, high speed downlink packet access (HSDPA), and other various communication standards.

The near-field communication module 153 can perform near-field wireless communication.

The first near-field communication module 153 can perform communication in accordance with at least one of Bluetooth, radio frequency identification (RFID), infrared data association (IrDA), ultra wideband (UWB), ZigBee, and other near-field communication standards.

The near-field communication module 153 can communicate with various external devices placed at a short distance. For example, the near-field communication module 153 can perform communication with a remote controller for controlling the electronic device 100 at a long distance.

The wired communication module 154 can connect the electronic device 100 and an external device in a wired manner.

The wired communication module 154 can perform communication with an external device through various interfaces. For example, the wired communication module 154 may perform communication with an external device through at least one of interface devices, such as a USB module capable of performing communication through a universal serial bus (USB) port, a port of an RS-232 standard, a headset port, an external charger port, a data port, a memory card port, an audio input/output (I/O) port, a video input/output (I/O) port, and an earphone jack.

The broadcast reception module 155 can receive at least one of broadcast signals and broadcast associated information from an external broadcast server via a broadcast channel. The broadcast channel may include at least one of a satellite channel and a terrestrial channel. The broadcast server may be a server for generating and sending at least one of a broadcast signal and broadcast associated information or a server for receiving a previously generated broadcast signal and broadcast associated information and sending the broadcast signal and the broadcast associated information to the electronic device. At least one of the broadcast signal and the broadcast associated information, received through the broadcast reception module 155, may be stored in the storage module 160.

In this instance, the broadcast signal may include a TV broadcast signal, a radio broadcast signal, and a data broadcast signal and may also include a signal in the form of various combinations of the TV broadcast signal, the radio broadcast signal, and the data broadcast signal.

The broadcast associated information may be information about a broadcasting channel, a broadcasting program, or a broadcasting service provider. The broadcast associated information may be provided even over an additional communication network.

The broadcast associated information may have various forms, such as an electronic program guide (EPG) of digital multimedia broadcasting (DMB) or an electronic service guide (ESG) of digital video broadcast-handheld (DVB-H).

The broadcast reception module 155 may receive broadcast signals through various broadcast systems. The broadcast systems may include digital multimedia broadcasting-terrestrial (DMB-T), digital multimedia broadcasting-satellite (DMB-S), media forward link only (MediaFLO), digital video broadcast-handheld (DVBH), and integrated services digital broadcast-terrestrial (ISDB-T), and various broadcast systems which are evident to a person having ordinary skill in the art to which the invention pertains.

The construction of the communication module 150 and the communication method of the communication module 150 are not limited to the above-described examples. The communication module 150 may include at least one of the above-described communication module and other communication devices which are evident to a person having ordinary skill in the art to which the invention pertains and may perform communication using at least one of various communication standards accordingly.

Furthermore, the communication module 150 needs not to perform communication with one external device through only a communication module and may perform communication with a plurality of external devices through a plurality of communication modules at the same time.

The storage module 160 can store information.

The storage module 160 may store information necessary for the operation of the electronic device 100 and information generated by the operation of the electronic device 100. The information necessary for the operation of the electronic device 100 may include, for example, an operating system (OS). The information generated by the operation of the electronic device 100 may include still images, moving images, volume information, and so on.

The storage module 160 may include a variety of storage media. For example, the storage module 160 may include at least one of flash memory, random access memory (RAM), static random access memory (SRAM), read only memory (ROM), electrically erasable programmable read only memory (EEPROM), a hard disk, magnetic memory, a magnetic disc, an optical disc such as CD or Blu-ray, card type memory such as an SD card, and other storage media which are evident to a person having ordinary skill in the art to which the invention pertains.

The storage module 160 may be provided in a form in which it is placed within the electronic device 100, a form in which it is external to the electronic device 100, or a form in which it is attached to and detached from the electronic device 100. The storage module 160 of a form in which it is external to the electronic device 100 may include not only an external hard disk, but also web storage for performing the storage function of the storage module 160 on the Internet.

The controller 170 can control the entire operation of the electronic device 100 and the other elements of the electronic device 100. For example, the controller 170 may associate various pieces of information with each other and perform processing so that the information can be used.

The controller 170 may be implemented using a computer or a similar device using software, hardware, or a combination of the software and hardware.

According to hardware implementations, the controller 170 may be implemented using at least one of application specific integrated circuits (ASICs), digital signal processors (DSPs), digital signal processing devices (DSPDs), programmable logic devices (PLDs), field programmable gate arrays (FPGAs), processors, controllers, microcontrollers, microprocessors, and an electrical device for performing a control function which is evident to a person having ordinary skill in the art to which the invention pertains.

According to software implementations, the controller 170 may be implemented using software codes or a software application which is written by one or more program languages. The software may be stored in the storage module 160 and executed by the hardware configuration of the controller 170. Furthermore, the software may be transmitted from an external device (for example, a server) to the electronic device 100 and then installed in the electronic device 100.

The controller 170 will be described in detail in connection with a description of a method for gesture recognition according to an embodiment of the invention.

The power supply module 180 can supply power to the electronic device 100. The power supply module 180 can receive external power or internal power under the control of the controller 170 and supply power for the operation of each of the elements of the electronic device 100.

Hereinafter, methods for gesture recognition according to embodiments of the invention are described.

The methods for gesture recognition according to the embodiments of the invention are described with reference to the electronic device 100 according to an embodiment of the invention.

The description of the methods for gesture recognition according to the embodiments of the invention with reference to the electronic device 100 according to the embodiment of the invention is only for facilitating understanding of the description, and the methods for gesture recognition according to the embodiments of the invention are not limited to the electronic device 100 according to the embodiment of the invention.

Accordingly, the method for gesture recognition according to the invention may be performed using other electronic devices which perform the same functions as or similar functions to the electronic device 100 according to the invention. In this instance, the other electronic devices may include television, digital television (DTV), Internet protocol television (IPTV), mobile phones, smart phones, personal digital assistants (PDA), portable multimedia players (PMP), personal computers (PC), laptop computers, tablet computers, digital broadcast terminals, mobile communication terminals, navigators, and other electronic devices which are evident to a person having ordinary skill in the art to which the invention pertains.

Figure 3:
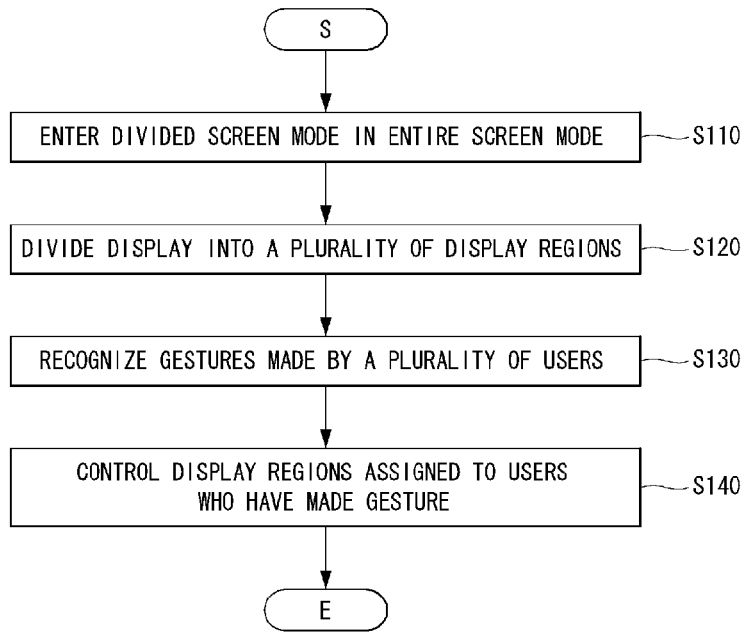
FIG. 3 is a flow chart illustrating a process of a method for gesture recognition according to a first example embodiment of the invention.

Hereinafter, a method for gesture recognition according to a first example embodiment of the invention will now be described with reference to FIG. 3. FIG. 3 is a flow chart illustrating a process of a method for gesture recognition according to a first example embodiment of the invention.

As shown in FIG. 3, the method for gesture recognition according to the first example embodiment of the invention may comprise at least one of operation (S110) of entering a divided screen mode in (or from) an entire screen mode, operation (S120) of dividing a display into a plurality of display regions, operation (S130) of recognizing gestures performed by a plurality of users, respectively, and operation (S140) of controlling the display regions assigned to the plurality of users who have made the gestures.

Each of the operations of the method for gesture recognition according to the first example embodiment of the invention will now be described.

The electronic device 100 may enter the divided screen mode in (or from) the entire screen mode (S110). This operation will now be described with reference to FIGS. 4 and 5.

Figure 4:
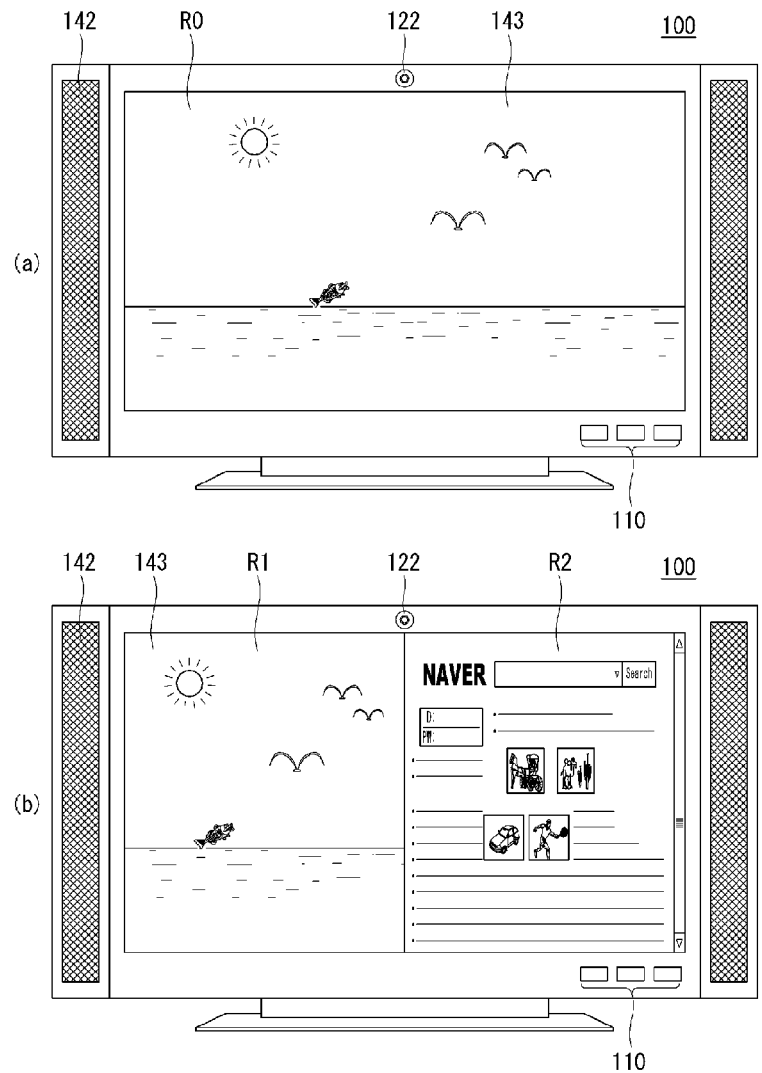
FIG. 4 is a view illustrating an entire screen mode and a divided screen mode in the method for gesture recognition according to the first example embodiment of the invention.
Figure 5:
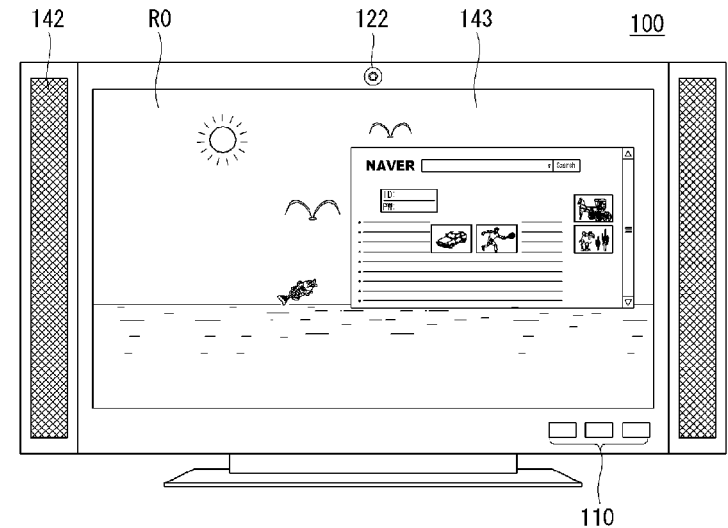
FIG. 5 is a view illustrating an entire screen mode in the method for gesture recognition according to the first example embodiment of the invention.

FIG. 4 is a view illustrating an entire screen mode and a divided screen mode in the method for gesture recognition according to the first example embodiment of the invention, and FIG. 5 is a view illustrating an entire screen mode in the method for gesture recognition according to the first example embodiment of the invention.

The electronic device 100 may enter the divided screen mode in the entire screen mode. In this instance, the entire screen mode may refer to a mode in which the entire screen is processed as a single display region, and the divided screen mode may refer to a mode in which the display is divided into a plurality of display regions and processed.

In the entire screen mode, the display may display contents in the single display region. For example, as shown in (a) of FIG. 4, video may be displayed as the entire screen R0. In another example, the display may display a Web browser as the entire screen R0.

In the divided screen mode, the display may display contents in each of the plurality of divided display regions. For example, as shown in (b) of FIG. 4, a video may be displayed in a first display region R1 and a Web browser may be displayed in the second display region R2.

In this instance, however, the display need not necessarily display only one content in the entire screen mode and only one content in each of the divided display regions in the divided screen mode. In other words, one or a plurality of contents may be displayed in each of the display regions. Namely, the entire screen mode and the divided screen mode are discriminated according to whether or not the entire screen of the display is processed as a single display region or a plurality of display regions, rather than being discriminated by the number of contents displayed on the display. For example, as shown in FIG. 5, even in the entire screen mode, a video and a Web browser may be displayed together on the entire screen R0 of the display.

When a pre-set event occurs in the entire screen mode of the electronic device 100, the electronic device 100 may enter the divided screen mode in (or from) the entire screen mode. The controller 170 detects the pre-set event, and in this instance, when the controller 170 detects the pre-set event while the electronic device is in the entire screen mode, the controller may control the electronic device 100 to enter the divided screen mode. In this instance, the pre-set event may vary.

For example, when a signal indicating an entry into the divided screen mode is received from an external device while the electronic device 100 is in the entire screen mode, the electronic device 100 may enter the divided screen mode. In this instance, the external device may refer to an input device, such as a remote controller, for controlling the electronic device 100.

In another example, when a voice instructing an entry into the divided screen mode is received from the user while the electronic device 100 is in the entire screen mode, the electronic device 100 may enter the divided screen mode.

In still another example, the electronic device 100 may recognize a user's gesture in the entire screen mode, and when the recognized user's gesture is a pre-set gesture for entering the divided screen mode, the electronic device 100 may enter the divided screen mode.

Figure 6:
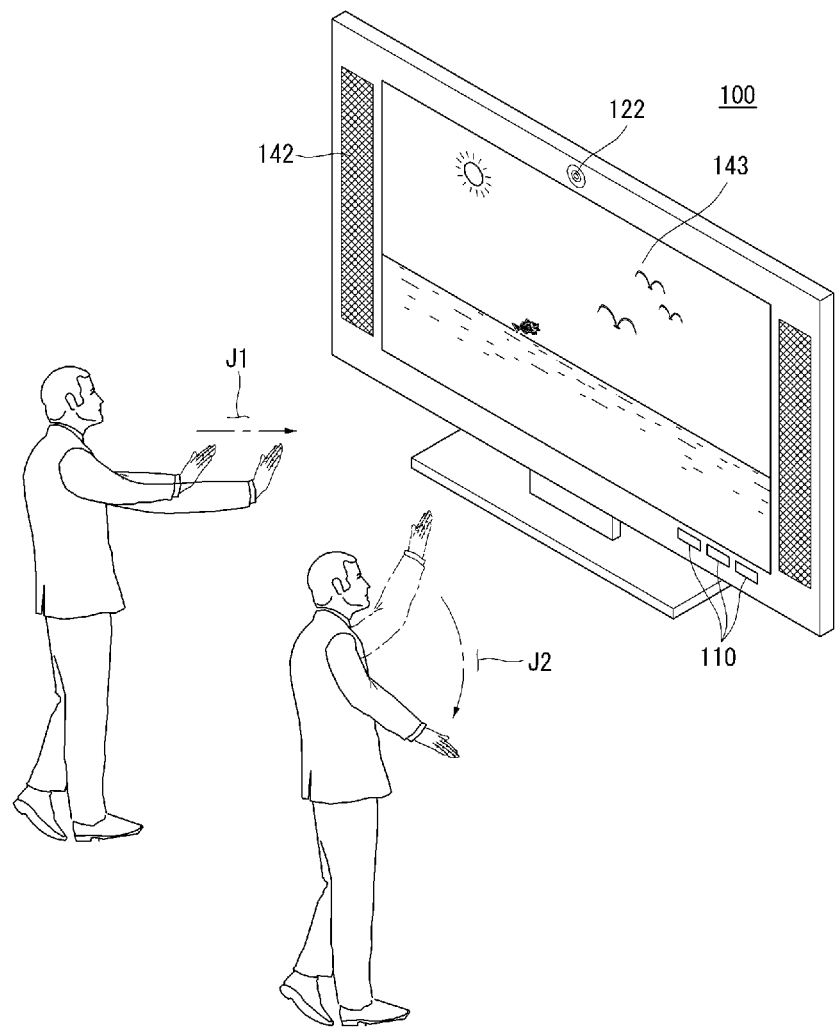
FIG. 6 is a view illustrating an entry of a divided screen mode according to a predetermined gesture in the method for gesture recognition according to the first example embodiment of the invention.

A method for recognizing a pre-set gesture in the entire screen mode will now be described with reference to FIG. 6. FIG. 6 is a view illustrating an entry of the divided screen mode according to a predetermined gesture in the method for gesture recognition according to the first example embodiment of the invention.

In the entire screen mode, the electronic device 100 may recognize only a gesture of a particular user, instead of recognizing a plurality of users' gestures. In other words, the electronic device 100 may give the authority to control (or the control rights) only to a particular user among the plurality of users and recognize the gesture of the user who has the authority to control.

In this instance, the authority to control (or the control rights) may refer to the authority to control the electronic device 100. In the entire screen mode, it may be advantageous that only the particular user has the authority to control the electronic device 100. In the entire screen mode, contents are provided through a single display region, so there is no need for all the users to control the electronic device 100. If all the users control the electronic device 100, there would occur a confusion among the users as if repeated or contradictory gestures were made and the electronic device 100 would perform an unnecessary operation and calculation.

Thus, the electronic device 100 may give the control rights to the user which has made a gesture requesting the obtaining of the control rights among the plurality of users, and thereafter, the electronic device 100 may recognize a gesture of the user who has the control rights, and perform an operation according to the recognized gesture. For example, when there is a user who has been given the control rights through the camera, although a different user makes a gesture for obtaining the control rights, the electronic device 100 may not give the control rights to the different user.

When the user does not want to control the electronic device 100 any longer, the user may perform a gesture for requesting a release of the control rights. When the user, who has the control rights, makes the gesture for requesting a release of the control rights, the electronic device 100 may release the user's control rights. Thus, there is no user who has the control rights, and in this state, when any one of the plurality of users makes a gesture for requesting the obtaining of the control rights, the electronic device 100 may newly give the control rights to the one user.

In this manner, the electronic device 100 may recognize only the gesture of the particular user, i.e., the user who has the control rights, among the plurality of users in the entire screen mode, and when the gesture is a predetermined gesture for indicating an entry to the divided screen mode, the electronic device 100 may enter the divided screen mode.

For example, in an instance in which a first user uses a Web browser in the entire screen mode with the control rights, when the electronic device 100 detects the predetermined gesture indicating the entry into the divided screen mode made by the first user, the electronic device 100 may enter the divided screen mode. In this instance, although a second user makes the predetermined gesture, the electronic device 100 may not enter the divided screen mode. In this instance, as shown in FIG. 6, the predetermined gesture may be a gesture J2 of lowering the user's arm.

In another example, when the first and second users are viewing a video through the electronic device 100 in the entire screen mode without the control rights, the first or the second user may obtain the control rights by making a gesture for requesting the obtaining of the control rights, and when the electronic device 100 detects the predetermined gesture for indicating the entry into the divided screen mode made by the user who has the control rights, the electronic device 100 may enter the divided screen mode. In this instance, as shown in FIG. 6, the gesture for requesting the obtaining of the gesture may be a push gesture J1.

Conversely, the electronic device 100 may return the entire screen mode upon recognizing a particular gesture in the divided screen mode.

For example, when the electronic device 100 divides the display into first and second display regions assigned to the first and second users, respectively, to perform the divided screen mode, the electronic device 100 may enter the entire screen mode as it recognizes a gesture for requesting a release of the divided screen mode or the entry into the entire screen mode made by any one of the first and second users.

In this instance, the electronic device 100 may identify (or recognize) the user who has made the gesture and provide the contents, which is being provided to a display region other than the display region assigned to the identified user in the entire screen mode, to the entire screen.

Figure 7:
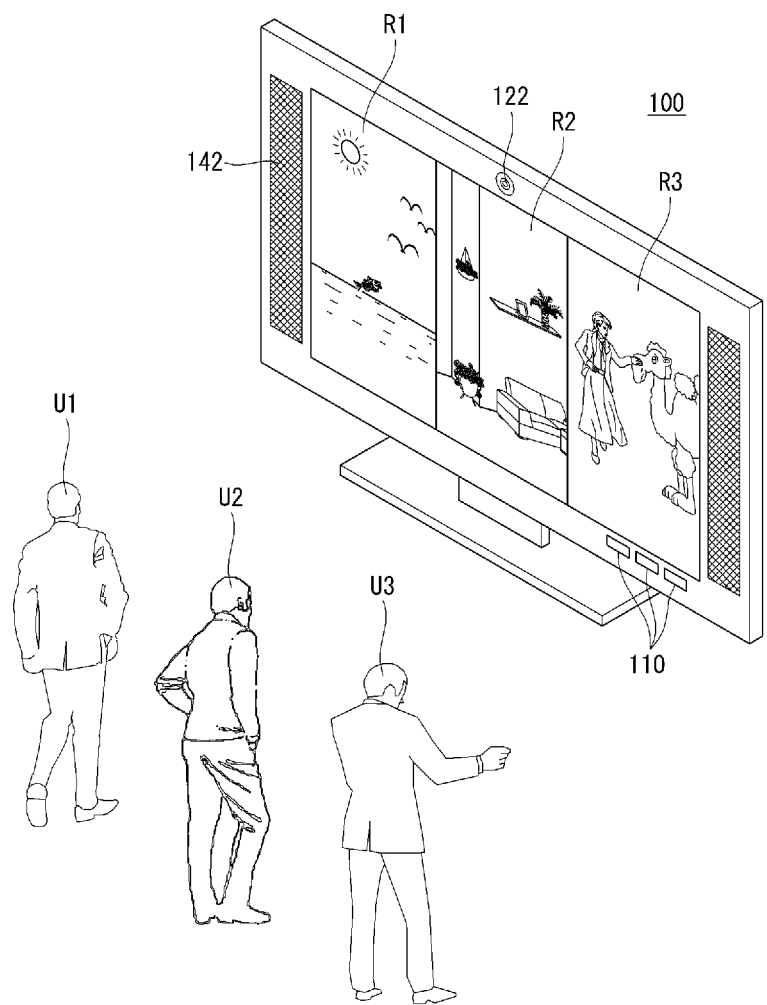
FIG. 7 is a view illustrating the number of a plurality of display regions in the method for gesture recognition according to the first example embodiment of the invention.
Figure 8:
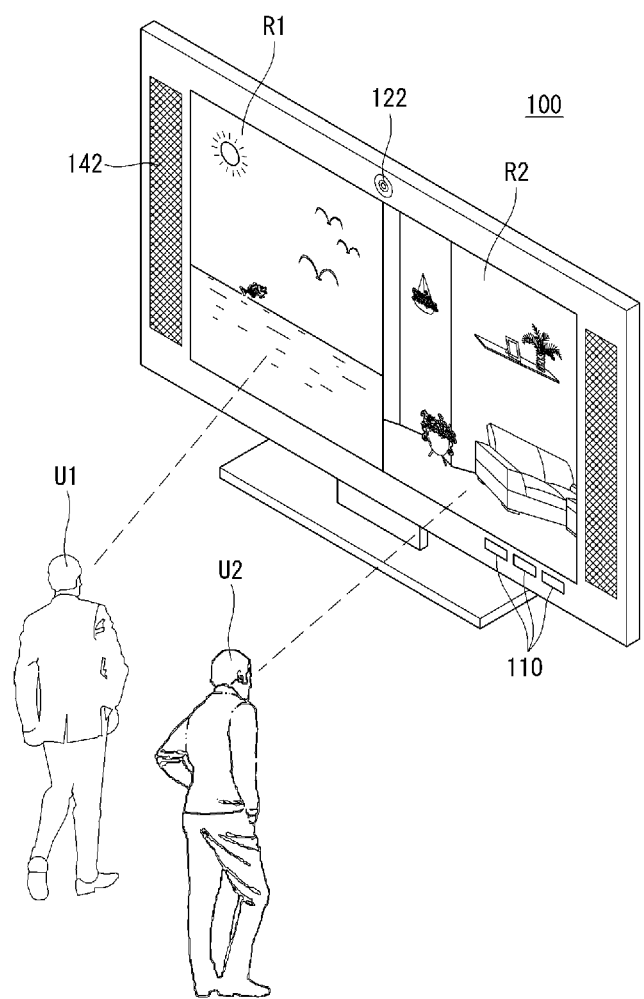
FIG. 8 is a view illustrating the locations of a plurality of display regions in the method for gesture recognition according to the first example embodiment of the invention.
Figure 9:
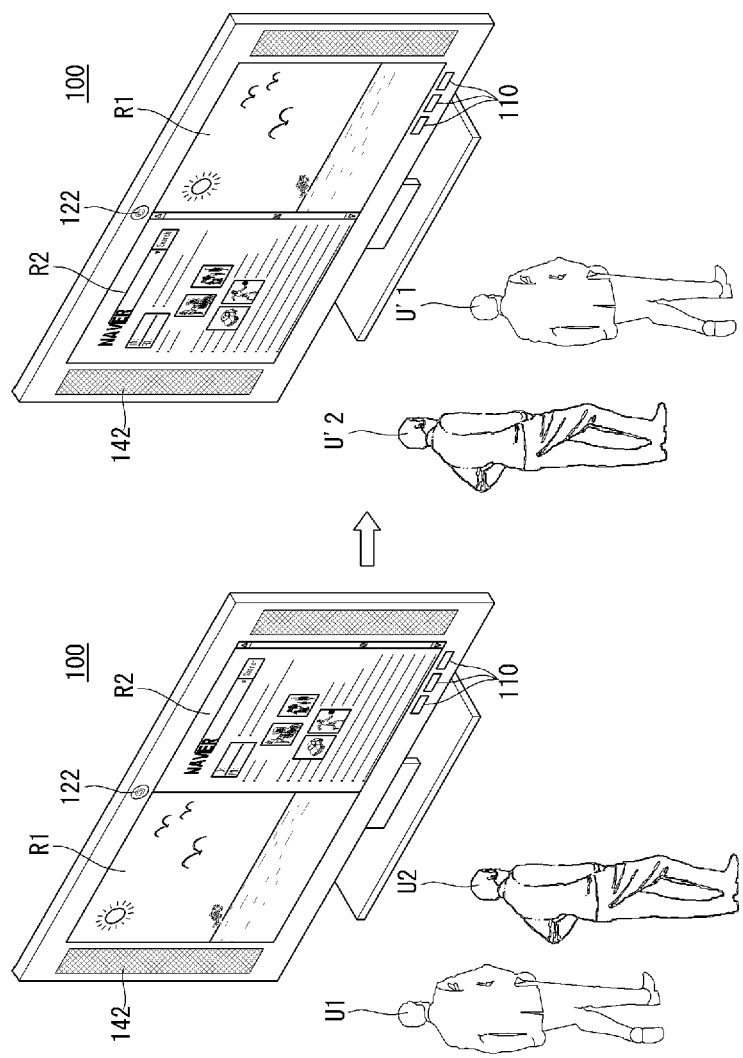
FIG. 9 is a view illustrating a change in the locations of a plurality of display regions in the method for gesture recognition according to the first example embodiment of the invention.
Figure 10:
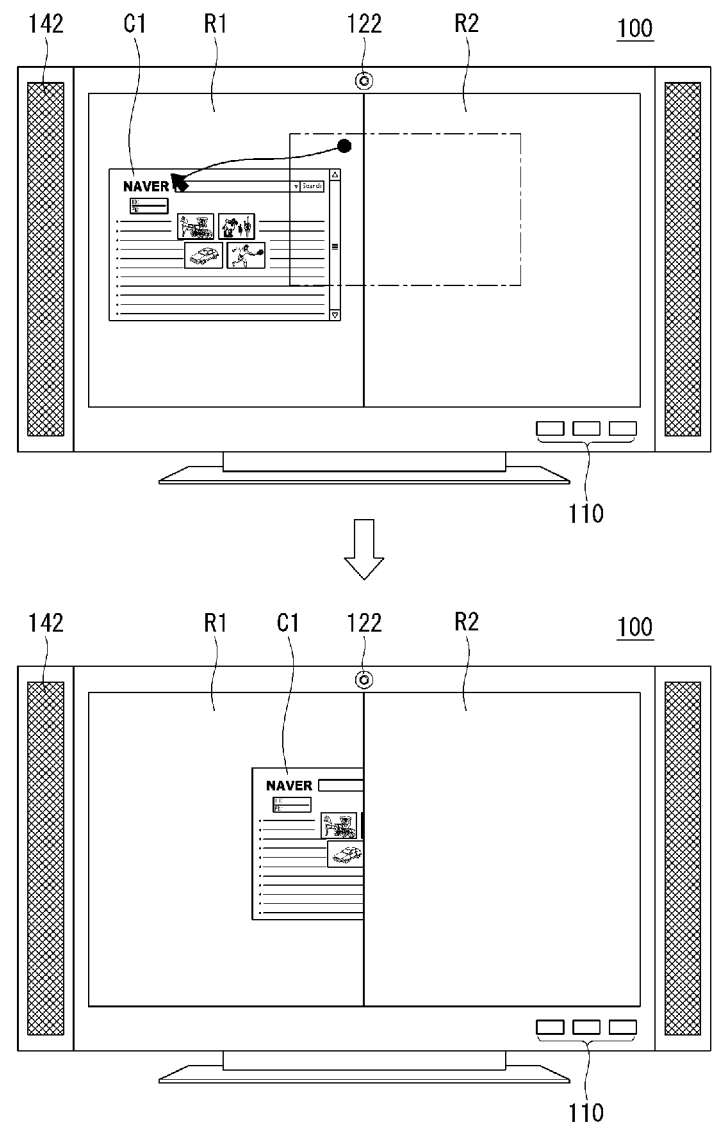
FIG. 10 is a first view of contents displayed on a plurality of display regions in the method for gesture recognition according to the first example embodiment of the invention.
Figure 11:
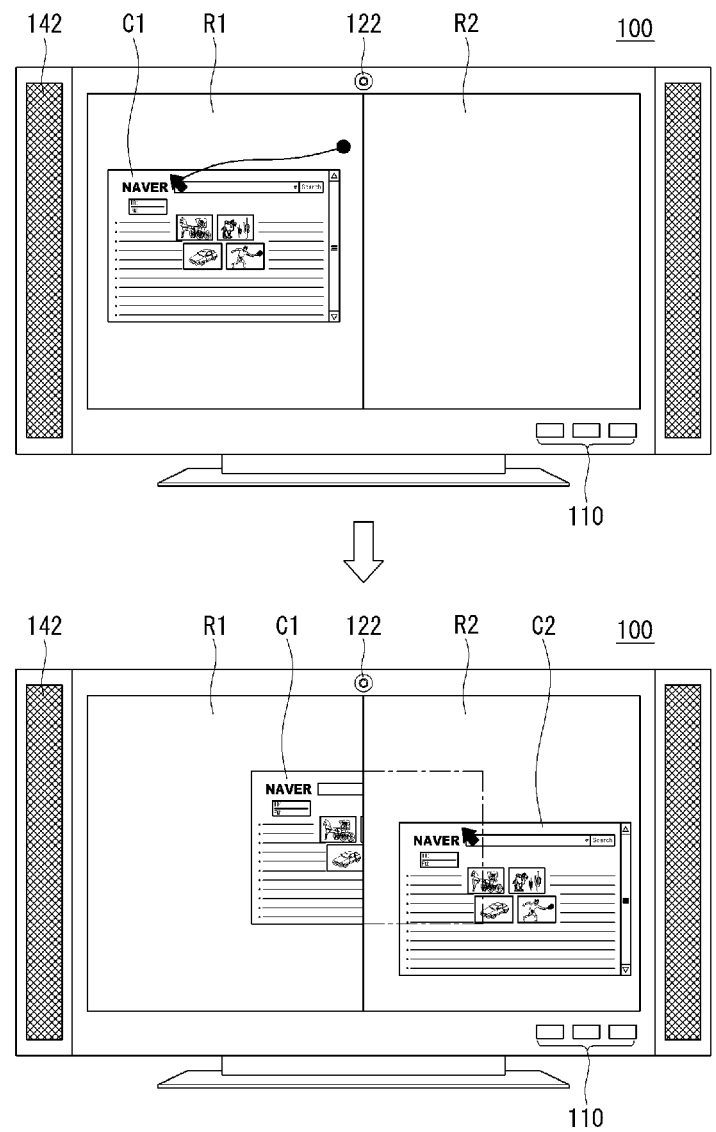
FIG. 11 is a second view of contents displayed on a plurality of display regions in the method for gesture recognition according to the first example embodiment of the invention.

The electronic device 100 may divide the display into a plurality of display regions (S120). This operation will now be described with reference to FIGS. 7, 8, 9, 10, 11, 12, and 13. FIG. 7 is a view illustrating the number of a plurality of display regions in the method for gesture recognition according to the first example embodiment of the invention. FIG. 8 is a view illustrating the locations of a plurality of display regions in the method for gesture recognition according to the first example embodiment of the invention. FIG. 9 is a view illustrating a change in the locations of a plurality of display regions in the method for gesture recognition according to the first example embodiment of the invention. FIG. 10 is a first view of contents displayed on a plurality of display regions in the method for gesture recognition according to the first example embodiment of the invention. FIG. 11 is a second view of contents displayed on a plurality of display regions in the method for gesture recognition according to the first example embodiment of the invention. FIG. 12 is a view illustrating contents continuously provided in the method for gesture recognition according to the first example embodiment of the invention. FIG. 13 is a view illustrating a common control region in the method for gesture recognition according to the first example embodiment of the invention.

As described above, when the electronic device 100 enters the divided screen mode, it may divide the display into a plurality of display regions. In this instance, the plurality of display regions may independently provide contents as described above.

The electronic device 100 may assign the plurality of display regions to the plurality of users, respectively. For example, the electronic device 100 may assign a first display region to a first user and a second display region to a second user. In this instance, the display regions may be controlled by the users to which the corresponding regions have been assigned.

The electronic device 100 may divide the display into the plurality of display regions which are assigned to the plurality of users, respectively, in various manners.

For example, the electronic device 100 may divide the display into the plurality of display regions in consideration of the number of the users. The camera captures an image, and the controller 170 may analyze the captured image to determine the number of the plurality of users within the image capture range. The electronic device 100 may determine the number of the plurality of display regions according to the obtained number of the plurality of the users and divide the display. As shown in FIG. 7, in an instance of three users U1, U2, and U3, the electronic device 100 may divide the display into three display regions R1, R2, and R3.

In another example, the electronic device 100 may divide the display into a plurality of display regions according to the locations of the user. The electronic device 100 may determine the locations of the users by using an image captured by the camera, or the like, divide the display into a plurality of display regions according to the locations of the users, and assign the plurality of display regions to the users, respectively. As shown in FIG. 8, when the first user U1 is located at the left and the second user U2 is located at the right, the electronic device 100 may divide the display such that the first display region R1 is positioned at a left portion of the display and the second display region R2 is positioned at a right portion of the display.

In this instance, even after the electronic device 100 enters the divided screen mode and divides the display into the plurality of display regions, the electronic device 100 may change the positions of the plurality of display regions according to the locations of the users. The electronic device 100 may continuously detect the locations of the users and change the positions of the display regions according to the locations of the users.

In embodiments of the invention, the electronic device 100 need not divide the screen to match the number of the display regions to the number of the users. For example, a plurality of users may be matched to, or may control, one of the display regions, or a user may be matched to, or may control, a plurality of the display regions.

As shown in FIG. 9, in a state in which the first user is located at the left and the second user U2 is located at the right, when the locations of the first and second users are changed such that the first user U'1 is located at the right and the second user U'2 are located at the left, the electronic device 100 may change the position of the first display region R1 from the left portion to the right portion of the display and the position of the second display region R2 from the right portion to the left portion. In this instance, the electronic device 100 can identify (or recognize) the users from the image obtained through the camera, and recognize where are the users. The electronic device 100 can identify the users through a method such as recognizing the users' faces included in the image.

Meanwhile, in the above drawings, the respective display regions are illustrated to have the same size, but the sizes of the display regions may not be necessarily equal and may have different sizes. Also, in FIGS. 7 and 8, the plurality of display regions are illustrated to be arranged in a horizontal direction, but the display regions need not be necessarily divided to be arranged in the horizontal direction. Namely, the display may be divided such that the display regions may be arranged in a vertical direction or in a diagonal direction, or may be disposed in a picture-in-picture (PIP) manner.

The electronic device 100 may divide the display into the plurality of display regions and provide contents through the respective display regions. Namely, the electronic device 100 may provide first contents through the first display region and second contents through the second display region.

In this instance, the respective contents may be subordinate to the display regions providing the respective contents. For example, the first contents provided through the first display region may not move to (or may not be displayed in) the second display region. As shown in FIG. 10, when a portion of the first contents C1 is moved to an outer side of the first display region R1, the electronic device 100 may not display the portion out of the range of the first display region R1. Also, as shown in FIG. 11, the electronic device 100 may display the portion of the first contents C1 out of the range of the first display region R1 such that it is black or may display it such that it is covered by the second contents C2 displayed on the second display region R2. In other embodiments of the invention, the first contents C1 may be prevented from going outside the bounds of the first display region R1. Accordingly, no part of the first contents C1 will be covered by the second display region R2.

When the electronic device 100 enters the divided screen mode, and the electronic device 100 divides the display into a plurality of display regions, the electronic device 100 may provide the contents, which has been provided in the entire screen mode, through one of the plurality of display regions.

For example, as shown in FIG. 12, when the electronic device 100, providing the video to the entire screen R0 in the entire screen mode, enters the divided screen mode, the electronic device 100 may continuously provide the video to the first display region R1. In this instance, the electronic device 100 may provide different contents such as a Web browser or a different video or a background screen, a menu, or the like, allowing for a selection of an application to be performed, or the like, through a display region, i.e., the second display region R2. Also, when the second display region provides the different contents, the electronic device 100 may mute a sound regarding the contents for the second display region R2.

When the electronic device 100 continuously provides the contents, which has been provided in the entire screen mode, to any one of the plurality of display regions, the electronic device 100 may determine to which display region the contents is to be continuously provided based on various types of information.

For example, when the electronic device 100 enters the divided screen mode according to a user's particular gesture, the electronic device 100 may continuously display the contents, which has been provided in the entire screen mode, in the display region assigned to a user other than the user who has made the gesture for requesting the entry into the divided screen mode. Or, conversely, the electronic device 100 may continuously display the contents in the display region assigned to the user who has made the gesture.

Meanwhile, the electronic device 100 may prepare a common display region commonly assigned to all of the plurality of the users, besides the display regions individually assigned to the respective users in the divided screen mode.

For example, the controller 170 may prepare a third display region RX, which can be controlled by at least one of the first and second users, on the display. As shown in FIG. 13, the third display region RX may be implemented in the form of a dock bar including items ITM regarding various applications. Also, items, such as volume, power, or the like, allowing for an access to basic functions of the electronic device 100, may be prepared on the third display region.

Figure 14:
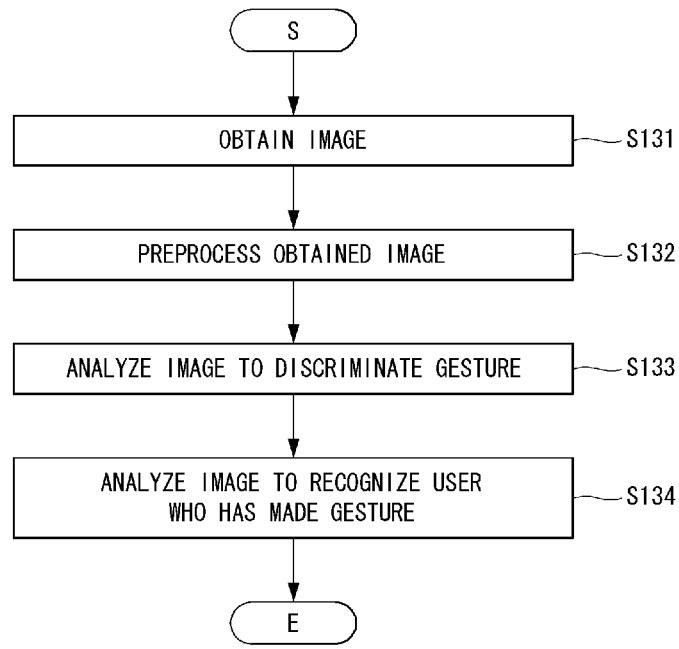
FIG. 14 is a flow chart illustrating the process of recognizing gestures made by a plurality of users in the method for gesture recognition according to the first example embodiment of the invention.

The electronic device 100 may recognize gestures made by the plurality of users (S130). This operation will now be described with reference to FIG. 14. FIG. 14 is a flow chart illustrating the process of recognizing gestures made by a plurality of users in the method for gesture recognition according to the first example embodiment of the invention.

When the electronic device 100 enters the divided screen mode, it can recognize gestures made by the plurality of users. The method for recognizing gestures made by the plurality of users may comprise at least one of operation (S131) of obtaining an image, operation (S132) of preprocessing the obtained image, operation (S133) of analyzing the image to discriminate a gesture, and operation (S134) of identifying a user who has made the gesture.

The method for recognizing gestures made by a plurality of users in the method for gesture recognition according to the first example embodiment of the invention will now be described.

Figure 15:
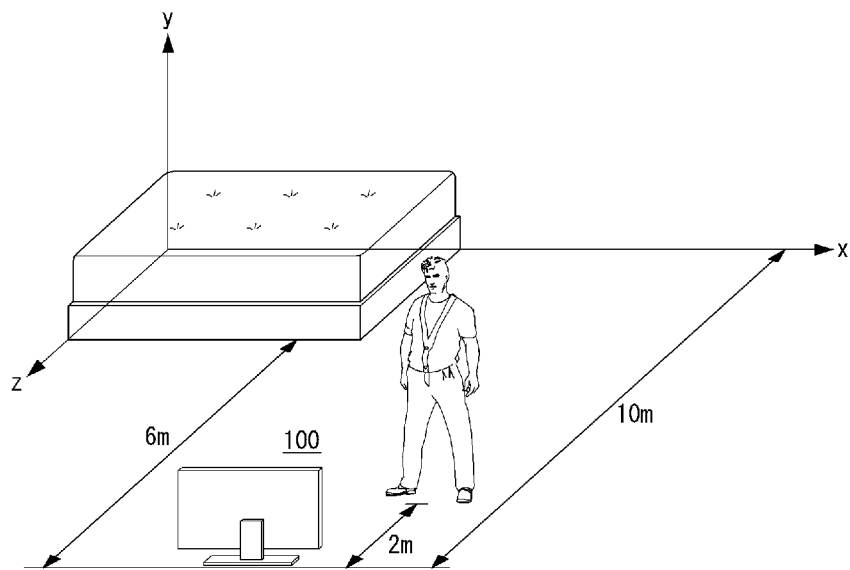
FIG. 15 is a view illustrating a method for obtaining a depth image by using a TOF camera in the method for gesture recognition according to the first example embodiment of the invention.
Figure 16:
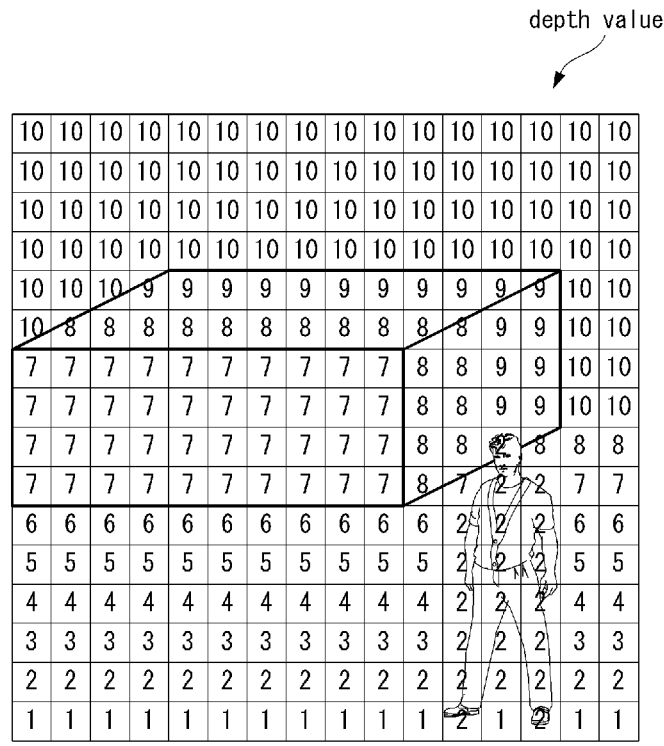
FIG. 16 is a view illustrating depth information obtained by the TOF camera in the method for gesture recognition according to the first example embodiment of the invention.
Figure 17:
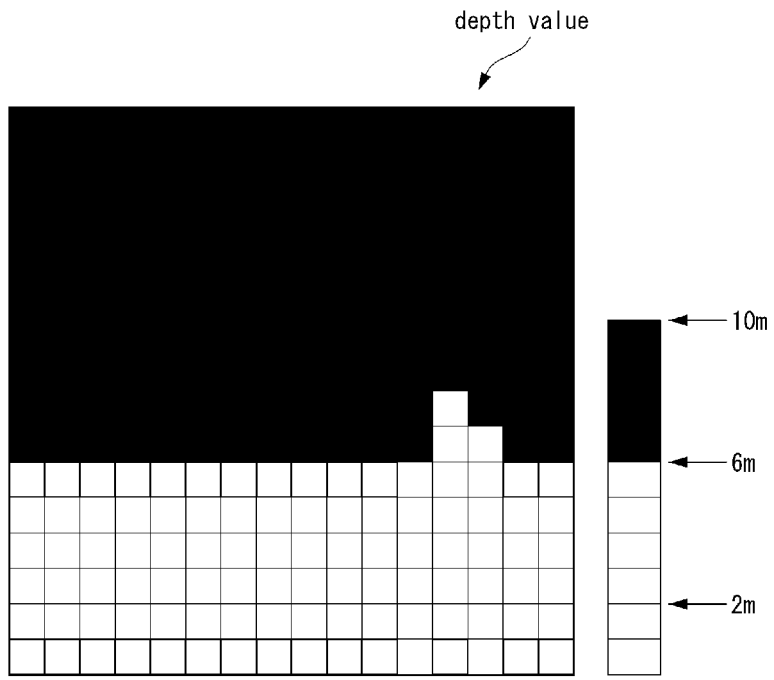
FIG. 17 is a view illustrating a depth image in the method for gesture recognition according to the first example embodiment of the invention.

The electronic device 100 may obtain an image (S131). This operation will now be described with reference to FIGS. 15 to 17. FIG. 15 is a view illustrating a method for obtaining a depth image by using a TOF camera in the method for gesture recognition according to the first example embodiment of the invention. FIG. 16 is a view illustrating depth information obtained by the TOF camera in the method for gesture recognition according to the first example embodiment of the invention. FIG. 17 is a view illustrating a depth image in the method for gesture recognition according to the first example embodiment of the invention.

The electronic device 100 may obtain an image through a camera.

For example, the electronic device 100 may obtain a two-dimensional (2D) image through a 2D camera. In this instance, the 2D image may include a color image such as an RGB (red-green-blue) image.

In another example, the electronic device 100 may obtain a three-dimensional (3D) image through a camera. In this instance, the 3D image may include a depth image directly including depth information or a 3D image generated by using at least two 2D images.

In this manner, the method for obtaining a 3D image by the electronic device 100 may be divided into an indirect method and a direct method.

In the indirect method, depth information is obtained by analyzing two or more 2-D images obtained at different view points. A representative indirect method may include a stereo matching method.

According to the stereo matching method, a reference image and a search image are obtained using left and right cameras. A disparity is calculated using a difference between the reference image and the search image for the same coordinates in space. A 3-D image can be obtained using a disparity map for each pixel of the reference image written according to the calculated disparity.

When a 3-D image is obtained using the indirect method, there are disadvantages in that error is likely to occur according to an illumination condition and the state of texture, reliability is low in a shielding area, and a long time is taken to obtain a dense disparity map because a computational load is great.

In the direct method, distance is directly measured through a 3-D camera, and the controller 170 obtains a depth image based on the measured distance. The direct method may include a method using a structured light camera, a method using a TOF camera, and a 3-D scanning method. The direct method is advantageous in that it can rapidly obtain a depth image reflecting accurate 3-D coordinate values and it does not generate error according to an illumination condition, as compared with the indirect method.

The structured light camera can radiate infrared rays to a subject and obtain depth information up to the subject by analyzing a scattering pattern of the infrared rays returned from the subject. The controller 170 can obtain a 3-D image based on the depth information.

The TOF camera can obtain depth information reflecting distance on the 3-D space, and the controller 170 can obtain a depth image based on the depth information.

As shown in FIG. 15, the video input module 122 implemented using a TOF camera can radiate light to an object and obtain depth information by recognizing distance up to the object based on the time that light reflected from the object takes to return back. For example, the TOF camera may obtain distance up to a person, distance up to a bed, and distance up to a wall as 2 m, 6 m, and 10 m, respectively, as shown in FIG. 15.

The depth information may be represented in the form of a depth value for each pixel, as shown in FIG. 16. The depth value may have a predetermined range of a numerical value. For example, the depth value may have a value ranging from 0 to 255 according to distance. For example, the depth value 0 may correspond to the shortest distance that can be measured by the TOF camera, and the depth value 255 may correspond to the longest distance that can be measured by the TOF camera. The TOF camera may have an improved resolution according to an increase in the range of the depth value. For example, a 3-D camera, having a depth value of 0 to 255 and capable of measuring the depth of a maximum of 10 m, may have resolution of about 40 mm.

The controller 170 may obtain the depth image based on the depth information using the TOF camera. The depth image may be represented by brightness or color corresponding to a depth value. As shown in FIG. 17, the depth image may be an image which is represented by a high luminosity at a close distance and a low luminosity at a long distance. The person closely placed may be represented by white, the bed intermediately placed may be represented by gray, and the wall distantly placed may be represented by black, in the depth image shown in FIG. 17. Methods other than grayscale or different colors may be used to represent the depth image.

When the controller 170 obtains the 3-D image using the TOF camera, it may obtain a real-time 3-D image because it can obtain the depth image of several tens of frames or more per second.

The electronic device 100 may pre-process the obtained image at operation 5132.

The controller 170 may perform the pre-processing on the obtained image in order to analyze the image.

The pre-processing of the image may comprise at least one of angular correction, tone correction, brightness correction, shadow correction, and noise cancellation for the image. In this instance, the tone correction may be a process of performing at least one of the graying of the image, the binarization of black and white, and the emphasis of a specific color. The shadow correction may be a process of adjusting the thickness of a boundary line appearing in the image. The noise cancellation may be a process of canceling noise included in the image.

The pre-processed image may have an improved definition, a clearer boundary line, or reduced noise, as compared with an original image. Accordingly, the controller 170 can perform the analysis of the image accurately and easily using the pre-processed image.

The electronic device 100 may recognize a gesture by analyzing the image at operation 5133. This operation is described with reference to FIGS. 18, 19, 20, and 21.

Figure 20:
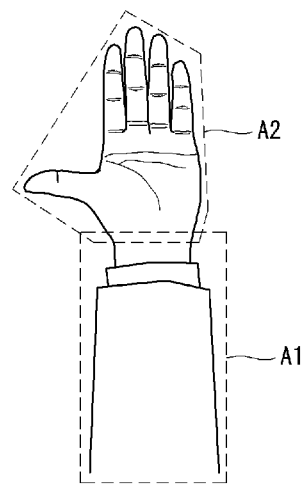
FIG. 20 is a second view illustrating a detection of a hand region using a hand shape in the method for gesture recognition according to the first example embodiment of the invention.
Figure 21:
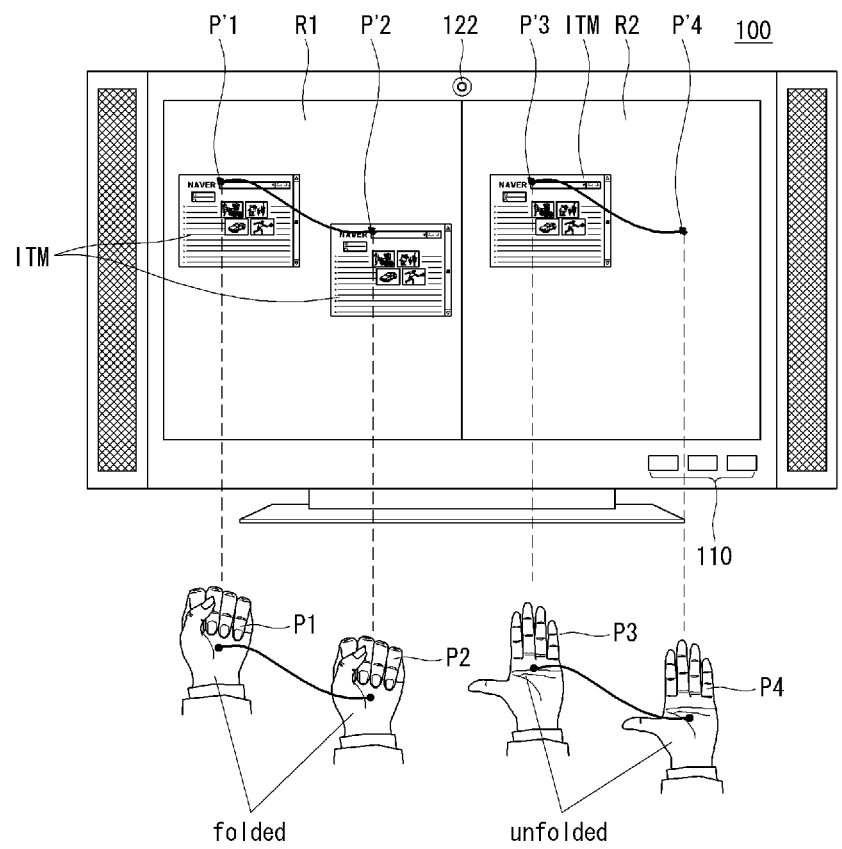
FIG. 21 is a view illustrating recognition of a gesture in the method for gesture recognition according to the first example embodiment of the invention.

This operation will be described with reference to FIGS. 18 to 21. FIG. 18 is a view illustrating a detection of a hand region using a skin color in the method for gesture recognition according to the first example embodiment of the invention. FIG. 19 is a first view illustrating a detection of a hand region using a hand shape in the method for gesture recognition according to the first example embodiment of the invention. FIG. 20 is a second view illustrating a detection of a hand region using a hand shape in the method for gesture recognition according to the first example embodiment of the invention. FIG. 21 is a view illustrating recognition of a gesture in the method for gesture recognition according to the first example embodiment of the invention.

The electronic device 100 may detect a hand region from an image and analyze the detected hand region to detect a change in the state of the hand to recognize a gesture.

The controller 170 can detect the hand region from the image. The controller 170 may identify the hand from the image pre-processed as described above or may identify the hand from an original image.

The controller 170, as shown in FIG. 18, can detect the hand region by tracking a region in which the color value of the image corresponds to the color of the skin. In this instance, a region corresponding to a face shown in FIG. 18 may be detected together with the hand. The controller 170 may detect only the hand region HA by distinguishing the face region FA and the hand region HA on the basis of the size or shape of the region.

In order to detect the region in which a color value corresponds to the color of the skin, the controller 170 may use various color spaces. Not only a red-green-blue (RGB) coordinate system, but also a hue-saturation-intensity (HSI) coordinate system, a hue-saturation-lightness (HSL) coordinate system, and an YCrCb coordinate system may be used as the color space. In particular, the tracking of the color of the skin using the color space is likely to be subjected to illumination. If the YCrCb coordinate system is used, the color of the skin can be tracked relatively robustly.

In some embodiments, the controller 170, as shown in FIGS. 19 and 20, may detect the region of the hand by tracking the shape of the hand from the image. The hand of a person includes fingers, and the hand is connected to a wrist. The controller 170 may extract a boundary line from the image and detect a region, including a quadrangle A1 (that is, the wrist) and a pentagon A2 (that is, the hand), as the hand region using the detected boundary line.

The electronic device 100 may detect a change in the state of the hand from the detected hand region to recognize a gesture.

The controller 170 may detect a change in the state of the hand including at least one of the position, speed, and shape of the hand from the detected hand region to recognize a gesture. In this instance, the controller 170 may track the hand region to obtain coordinates corresponding to the location of the hand to determine the location of the hand. Alternatively, the hand extends from the center of the hand to the wrist, and to the five fingers, so the controller 170 may detect the boundary of the hand region or depth information of the hand region to determine the shape of the hand.

For example, as shown in FIG. 21, when the controller analyzes the hand region and detects that the hand is in a folded (or closed) state and moves from a first position P1 to a second position P2, the controller may recognize it as a dragging gesture and perform a drag operation. In this instance, the drag operation may refer to an operation of moving a particular item ITM from one portion to another portion of the first display region R1, for example.

In another example, as shown in FIG. 21, when the controller 170 analyzes the hand region and detects that the hand is in an unfolded state and moves from a third position P3 to a fourth position P4, the controller 170 may recognize it as a hovering gesture and perform a hovering operation. In this instance, the hovering operation may refer to an operation of moving a cursor or an indicator indicating the location of the hand in the second display region R2, for example.

In still another example, when the controller 170 analyzes the hand region and detects that the hand is changed from an unfolded state to a folded state or that a finger is changed from an unfolded state to a bent state (a folded state or a closed stated), the controller 170 may recognize it as a click gesture and perform a click operation. In this instance, the click operation may refer to an operation of selecting or executing a particular item. Meanwhile, when such an operation (i.e., going from a folded state to an unfolded state or vice versa) is performed twice at a predetermined time interval, the controller 170 may recognize it as a double click gesture and perform a double click operation. In this instance, the double click operation may refer to an operation of executing a particular item.

Similarly, the controller 170 may analyze the hand region to recognize a gesture for lowering the hand to indicate a release of the control rights, a flicking gesture, and various other gestures corresponding to particular operations.

The electronic device 100 may analyze an image to identify a user who has made a gesture (S134).

For example, the controller 170 may analyze an image to identify a user who has made a gesture. The controller 170 may detect a user region connected to the hand which has made the gesture by using the boundary line, depth information, or the like, to identify the user who has made the gesture.

Alternatively, the controller 170 may detect the user region connected to the hand which has made the gesture by analyzing the image, detect a face region from the user region to identify the user through face recognition.

The controller 170 may detect the face region in various manners.

First, the face includes a skin color of a person and the color of the person and head overall, and partially includes the color of eyes, white color of the part of the eyeball, and the color of the lips. The controller 170 may extract a region in which the foregoing colors are concentrated in the image as a face image by using the color information.

Second, the face includes eyes, nose, mouth, and ears, and such components of the face are disposed in a certain geometrical shape. The controller 170 may detect the boundary line from the image, and extract the region in which the boundary lines estimated to be the components are disposed in a certain geometrical shape, as a face image.

Third, since the face generally has an oval shape, a circular shape, or an egg-like shape, the controller 170 can extract the interior of the boundary lines including such shapes through the detection of the boundary lines, as a face image.

The controller 170 may extract the face region from the captured image by using at least one of the foregoing method, the method for detecting the face by using an Eigen function, a method for detecting the face by using a nerve net, and any other methods for extracting a face image obvious to a person skilled in the art to which the invention pertains.

The controller 170 may analyze at least one of the features regarding each of the components of the face such as the eyes, noise, mouth, ears, and the like, and the features regarding the relationship therebetween, to obtain face information including such features to identify the user.

The features of each of the components of the face may include at least one of the positions, lengths, angles, sizes, and forms of the respective components of the face, and the relationship between the components may include a position relationship between the respective components. For example, the controller 170 may analyze the face image to obtain face information regarding the distance between the eyes, the angle of the eyebrows, the size of the nose, the size of the mouth, and the like.

The controller 170 may analyze the face information by using a structural method for finding geometrical features, a method using a mathematical conversion filter such as a polar coordinate system conversion, a wavelet conversion, or the like, a method for using statistical models such as a principal component analysis, a local feature analysis, a linear discriminant analysis, or the like, a method using a K-L conversion, a nerve net model, a Bayesian probability model regarding 3D information, and the like, to obtain the face information.

The controller 170 can identify the user who has made the gesture by using the obtained face information.

Figure 22:
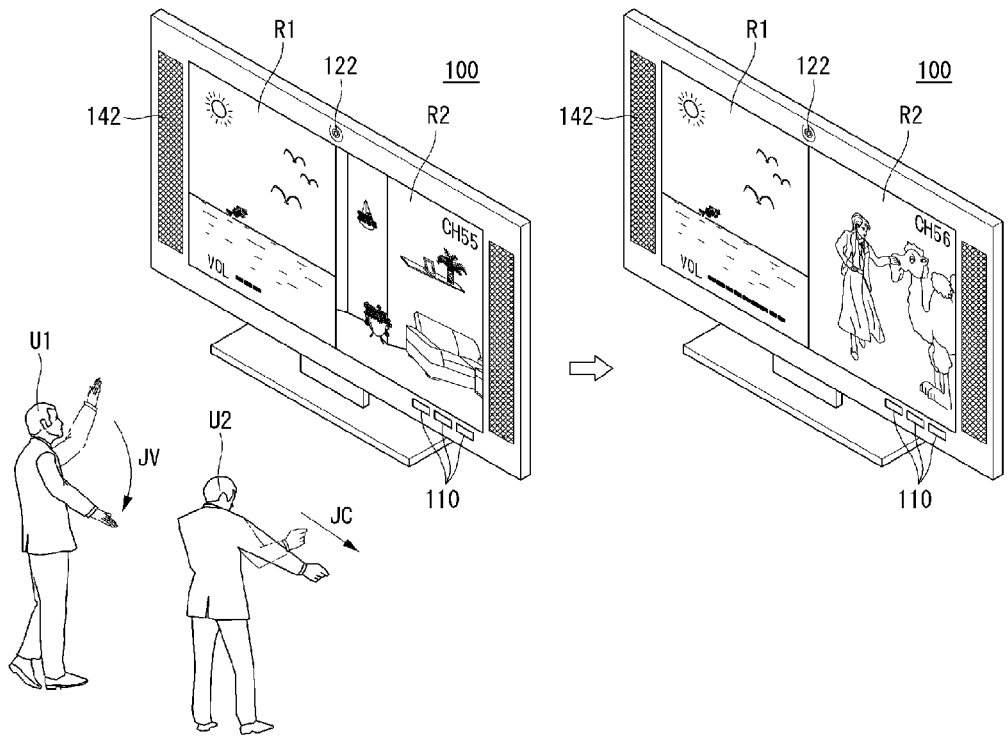
FIG. 22 is a first view illustrating controlling of a display region assigned to a user who has made a gesture in the method for gesture recognition according to the first example embodiment of the invention.
Figure 23:
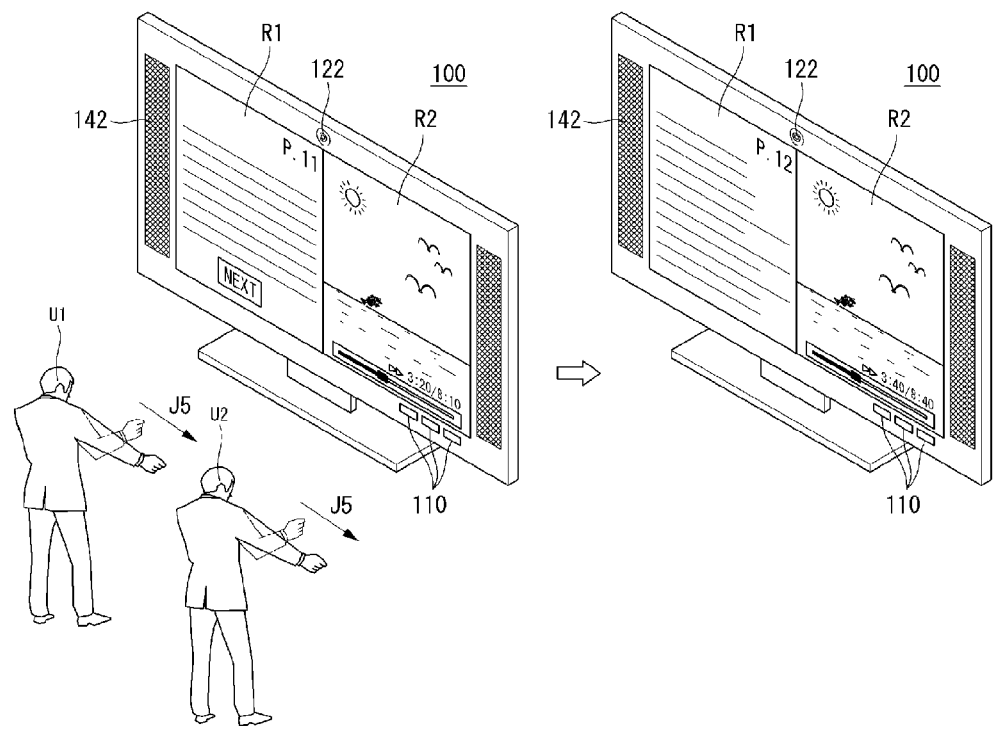
FIG. 23 is a second view illustrating controlling of a display region assigned to a user who has made a gesture in the method for gesture recognition according to the first example embodiment of the invention.
Figure 24:
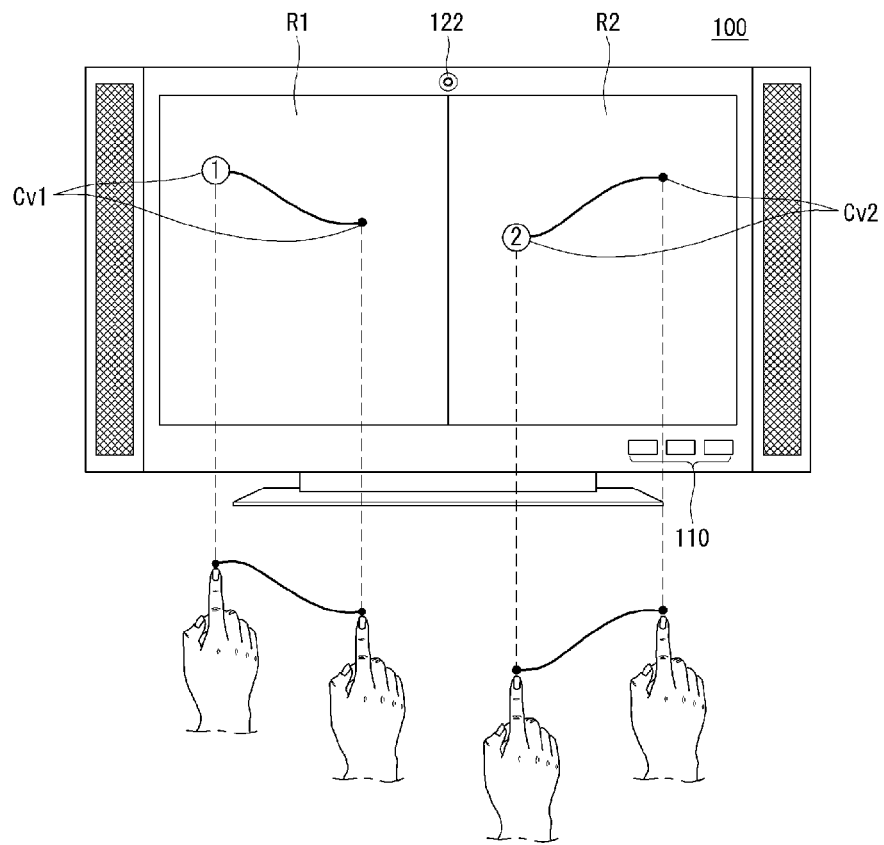
FIG. 24 is a first view illustrating a cursor displayed in a display region in the method for gesture recognition according to the first example embodiment of the invention.
Figure 25:
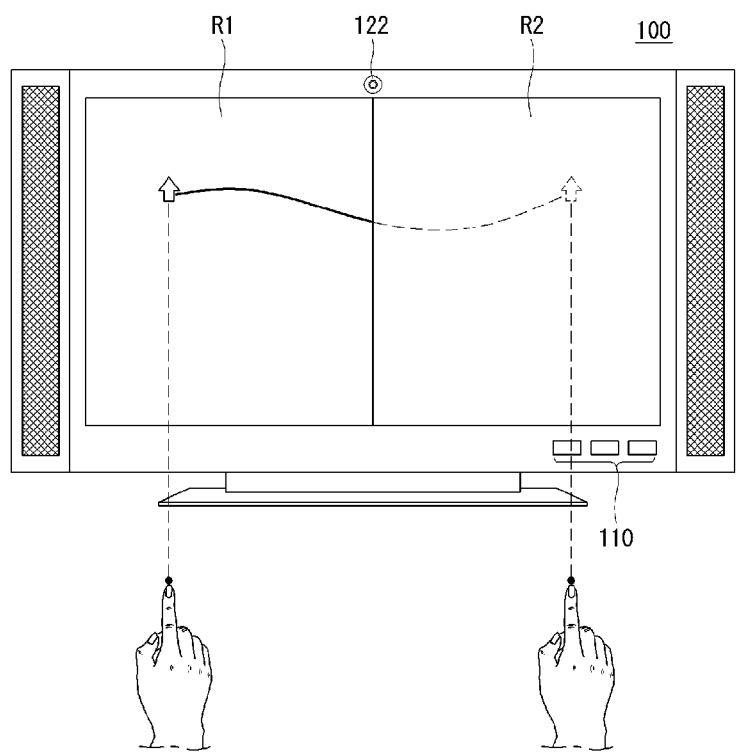
FIG. 25 is a second view illustrating a cursor displayed in a display region in the method for gesture recognition according to the first example embodiment of the invention.
Figure 26:
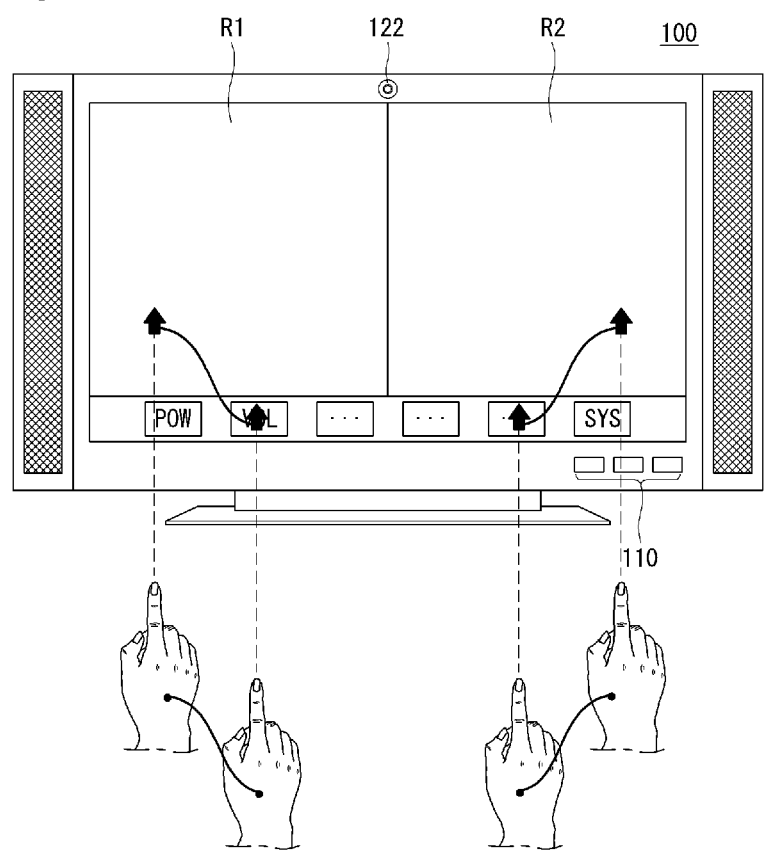
FIG. 26 is a view illustrating a cursor displayed in a common control region in the method for gesture recognition according to the first example embodiment of the invention.
Figure 27:
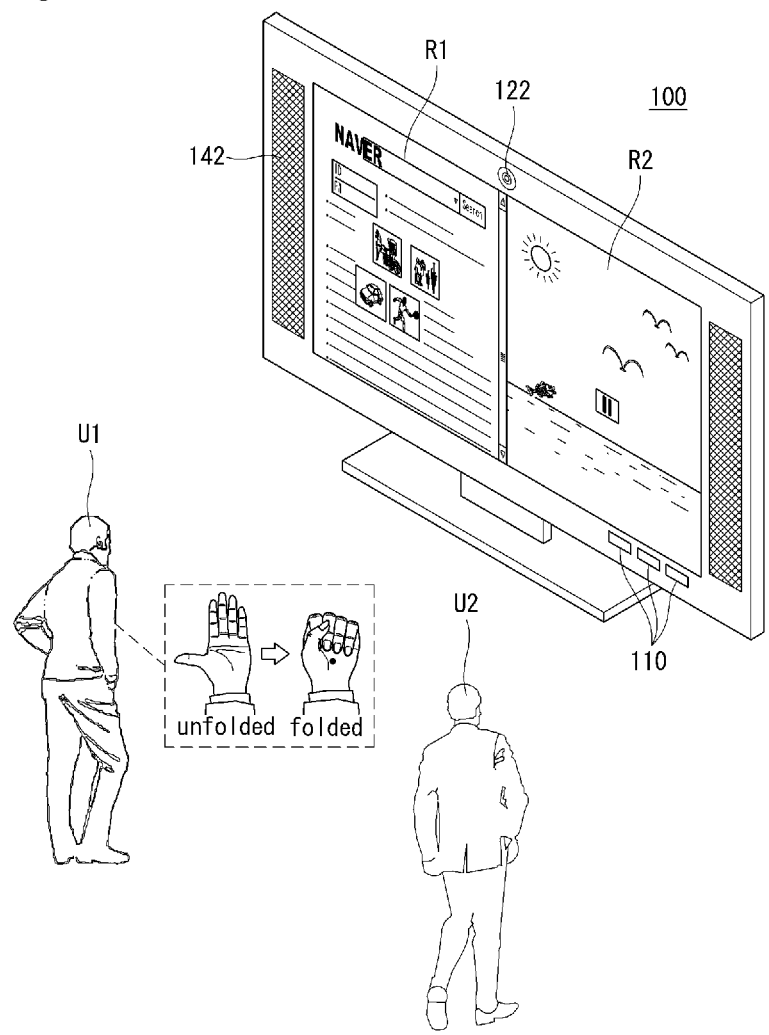
FIG. 27 is a view illustrating controlling of a display region assigned to a user other than a user who has made a gesture in the method for gesture recognition according to the first example embodiment of the invention.
Figure 28:
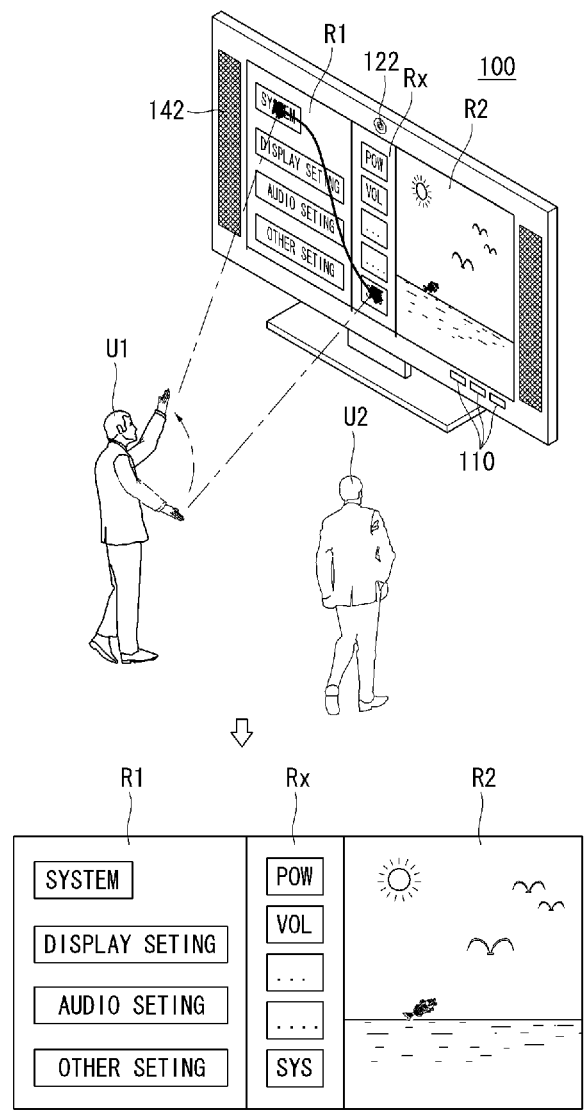
FIG. 28 is a view illustrating controlling a common control region in the method for gesture recognition according to the first example embodiment of the invention.

The electronic device 100 may control the display region assigned to the user who has made the gesture (S140). This operation will be described with reference to FIGS. 22 to 26, and FIGS. 31 and 32. FIGS. 22 and 23 are views illustrating controlling of a display region assigned to a user who has made a gesture in the method for gesture recognition according to the first example embodiment of the invention. FIGS. 24 and 25 are views illustrating a cursor displayed in a display region in the method for gesture recognition according to the first example embodiment of the invention. FIG. 26 is a view illustrating a cursor displayed in a common control region in the method for gesture recognition according to the first example embodiment of the invention. FIG. 27 is a view illustrating controlling of a display region assigned to a user other than a user who has made a gesture in the method for gesture recognition according to the first example embodiment of the invention. FIG. 28 is a view illustrating controlling a common control region in the method for gesture recognition according to the first example embodiment of the invention.

As described above, the controller 170 may recognize gestures made by a plurality of users and identify the users who have made the gestures, respectively.

According to the results of identifying the users who have made the gestures, the controller 170 can determine to which display region, among the plurality of display regions, the gestures are related. For example, when the electronic device 100 provides a first display region assigned to a first user and a second display region assigned to a second user, the controller 170 may determine the first display region assigned to the first user as a display region to be controlled by using a gesture. Similarly, when the second user makes a gesture, the controller 170 may determine the second display region as a display region to be controlled according to the gesture. In addition, when the first user makes a first gesture and the second user makes a second gesture simultaneously, the controller 170 may determine a display region with respect to the first gesture as a first display region and a display region with respect to the second gesture as a second display region.

When the controller 170 determines the display regions to be controlled by using gestures, the controller 170 may control the display regions according to the gestures.

For example, the controller 170 may control contents provided in a display region assigned to a user who has made a gesture according to the gesture made. As shown in FIG. 22, when the controller 170 divides the display into a first display region R1 assigned to a first user U1 and a second display region R2 assigned to the second user U2 and when the first user U1 makes a gesture indicating a change of a broadcast channel or a gesture JV indicating a change of the volume, the controller 170 may recognize the gesture and change the broadcast channel of the first display region R1 assigned to the first user U1 or reduce the volume of the contents provided to the first display region R1. When the second user U2 makes a gesture JC for indicating a change of a channel or a gesture for indicating a change of the volume, the channel of the second display region R2 or the volume of the contents of the second display region R2 will be changed while the channel of the first display region or the volume of the contents of the first display region will not be changed.

Similarly, when a display region of the electronic device 100 provides a Web browser, an e-book, a video, and various other applications, the controller 170 may recognize a gesture corresponding to a particular function of a pertinent application and perform the particular function of the application when the user who has made the gesture is a user corresponding to the display region. As shown in FIG. 23, the first user U1 and the second user U2 may make a flicking gesture J5 for moving their hand from the left to the right, respectively. The flicking gesture J5 may be a gesture for requesting a next page in case of the e-book application, or may be a function for requesting fast-forward in case of the video. The electronic device 100 may recognize the flicking gesture J5 of the first user U1 and the second user U2, output a next page of the e-book displayed in the first display region assigned to the first user U1 according to the gesture of the first user U1 and perform fast-forward with respect to the video displayed in the second display region R2 assigned to the second user U2 according to the gesture of the second user U2.

In another example, the controller 170 may display a cursor or an indicator reflecting the location of the hand in a display region according to a gesture. As shown in FIG. 24, the controller 170 may display a first cursor Cv1 in the first display region R1 according to a hovering gesture recognized by tracking the location of the first user's hand, and display a second cursor Cv2 din the second display region R2 according to a hovering gesture recognized by tracking the location of the second user's hand. In this instance, the first cursor Cv1 and the second cursor Cv2 may be displayed to be discriminated from each other. Namely, the first and second cursors may be different in shape, size, color, and the like.

In this instance, the controller 170 may display the cursor reflecting the location of the user's hand only on the display region assigned to the user. In other words, the first cursor reflecting the location of the first user's hand is displayed only on the first display region and cannot enter the second display region. Although the location of the first user's hand moves to a space corresponding to the second display region, the controller 170 may display the first cursor on the first display region or may delete the cursor from the display. Alternatively, as shown in FIG. 25, when the location of the first user's hand moves to the space corresponding to the second display region R2, the controller 170 may display the first cursor Cv1 on the second display region R2. In this instance, the controller 170 may change the display attributes of the cursor. For example, when the first cursor is displayed on the second display region, the controller 170 may adjust the shape, size, color, transparency, or the like, of the cursor.

Meanwhile, when the display is divided into the display regions assigned to the respective users and a common control region controlled by all the users, the cursors of the plurality of users may enter the common control region as shown in FIG. 26.

As described above, in general, the electronic device 100 controls the display region assigned to the user who has made the gesture according to the gesture made, but exceptionally, the electronic device 100 may control a display region other than the display region assigned to the user, among the plurality of display regions, according to the user's gesture.

First, in an embodiment of the invention, the controller may control a display region assigned to a user other than the user who has made the gesture according to the user's gesture.

When a gesture requesting a particular function is recognized, the controller 170 may control the display region not assigned to the user who has made the gesture according to the gesture. In this instance, the particular function may include various functions such as mute, temporary stop of a video, and the like.

As shown in FIG. 27, when the controller recognizes a gesture of, for example, folding an unfolded hand requesting, for example, a temporary stop of the video made by the first user U1, the controller 170 may temporarily stop the video being reproduced in the second display region R2 assigned to the second user U2. In this instance, when the video is being reproduced also in the first display region, the video of the first display region may be also stopped. Of course, when the gesture for controlling the display region assigned to the user is different from a gesture for controlling a display region assigned to a different user, the video of the first display region may not be stopped. Also, when the first display region is providing a Web browser or other contents, rather than the video, the gesture for indicating the temporary stop of the video of the first user may be irrelevant to the controlling of the first display region.

Second, as described above, the electronic device 100 may provide a common control region which can be controlled by all the plurality of users. The controller 170 may control the common control region according to a user's gesture. As shown in FIG. 28, the common control region Rx may be provided in the form of a menu or a dock bar regarding basic functions of the electronic device 100. The electronic device 100 may control the common control region Rx or contents provided in the common control region Rx according to a gesture made by the first user or the second user.

According to the method for gesture recognition according to the first example embodiment of the invention, since the display is divided so as to be provided as a plurality of display regions, the plurality of users can be provided with desired contents, respectively.

Also, since the divided display regions are controlled according to the gestures of the users who have the control rights with respect to the display regions, the users can use the electronic device 100 through the display regions assigned to them.

Accordingly, the plurality of users can perform different operations by using the single electronic device 100.

Figure 29:
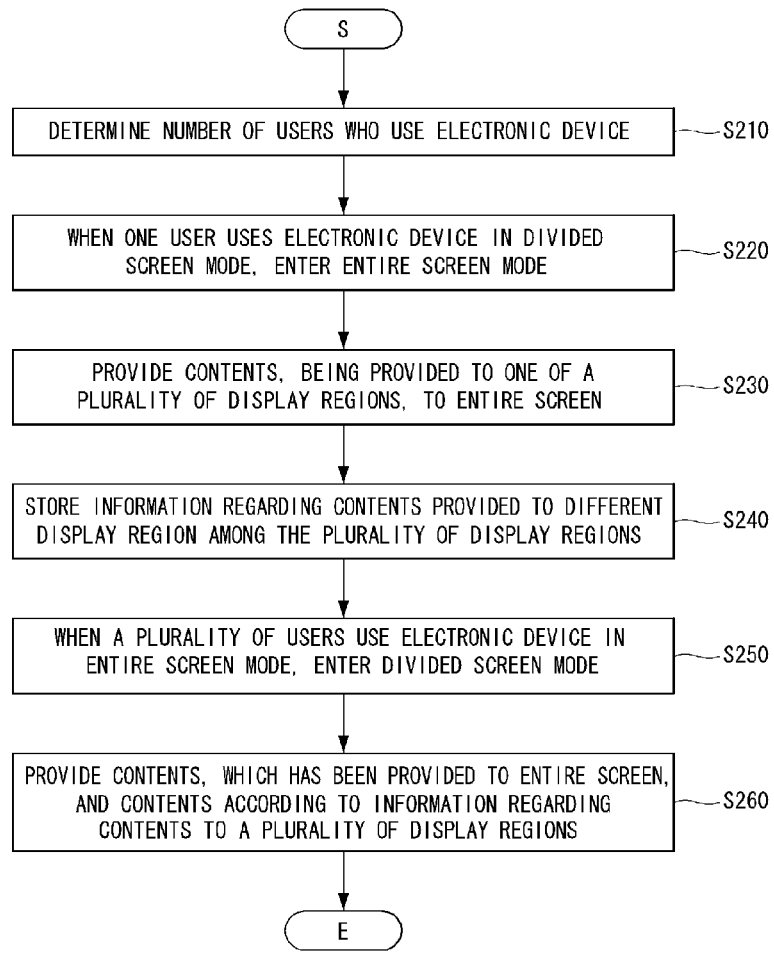
FIG. 29 is a flow chart illustrating process of a method for gesture recognition according to a second example embodiment of the invention.

A method for gesture recognition according to a second example embodiment of the invention will now be described with reference to FIG. 29. FIG. 29 is a flow chart illustrating process of a method for gesture recognition according to a second example embodiment of the invention.

As shown in FIG. 29, a method for gesture recognition according to the second example embodiment of the invention may comprise at least one of operation (S210) of determining the number of users who use the electronic device 100, operation (S220) of entering the entire screen mode when only one user uses the electronic device 100 in the divided screen mode, operation (S230) of providing contents, which are provided to any one of a plurality of display regions, to the entire screen, operation (S240) of storing information regarding the contents provided to a different display region among the plurality of display regions, operation (S250) of entering the divided screen mode when a plurality of users use the electronic device 100 in the entire screen mode, and operation (S260) of providing at least one of contents provided to the entire screen and contents according to the information regarding stored contents to one or more of the plurality of display regions.

Each operation of the method for gesture recognition according to the second example embodiment of the invention will now be described.

The electronic device 100 may determine the number of users who use the electronic device 100 (S210).

The controller 170 may determine the number of users who use the electronic device 100.

For example, the controller 170 may capture an image through a camera, analyze the image to determine the number of users located within the image capture range of the camera, and determine the number of users who use the electronic device 100.

In another example, the controller 170 may analyze the image captured by the camera to determine whether or not users are viewing the electronic device 100, and determine the number of the users who use the electronic device 100 based on the determination. In this instance, the controller 170 may detect face regions of the images and analyze the face regions to analyze the direction of the users' faces, the direction of visual fields, or the like. When the users' faces or the visual fields do not face the electronic device 100 during a pre-set period of time, the controller 170 determines that the users do not use the electronic device 100 and compares the number of the users who do not use the electronic device 100 with the number of the users within the image capture range to determine the number of the users who use the electronic device 100.

Of course, conversely, the controller 170 may determine the number of users who use the electronic device 100 based on the number of the users whose face or visual field faces the electronic device 100.

In another example, when an input regarding the controlling of the electronic device 100 including a gesture from a particular user is not received during a pre-set time interval, the controller 170 may determine that the particular user does not use the electronic device 100. In this instance, the pre-set time interval may be determined according to the type of the contents provided in the display region assigned to the particular user. When contents is a Web browser, a time interval is set to be short, and when the contents is video viewing, the time interval may be set to be long. Also, in case of the video viewing, generally, the user does not manipulate the electronic device 100 while viewing of the video is completed, so while the electronic device 100 is providing the video, the operation for determining whether or not the user uses the electronic device 100 by using a user input need not be performed.

When only one user uses the electronic device 100 in the divided screen mode, the electronic device 100 may enter the entire screen mode (S220).

As described above, the electronic device 100 can determine the number of users who use the electronic device 100. In this instance, when only one user uses the electronic device 100 in the divided screen mode, the controller 170 may release the divided state of the display and enter the entire screen mode.

Meanwhile, the electronic device 100 may not necessarily enter the entire screen mode in the divided screen mode only when only one user uses the electronic device 100 in the divided screen mode.

For example, when any one of the users makes a gesture for indicating an entry into the entire screen mode, the electronic device 100 may recognize it and enter the entire screen mode. In another example, when a signal indicating a return to the entire screen mode is input through a remote controller, the electronic device 100 may enter the entire screen mode. In still another example, when contents provided to any one of the plurality of display regions are terminated, specifically, when the reproduction of contents, i.e., a video, is terminated, the electronic device 100 may automatically returned to the entire screen mode.

Also, the electronic device 100 may not necessarily enter to the entire screen mode because only one user uses the electronic device 100 in the divided screen mode.

For example, when only one user uses the electronic device 100 in the divided screen mode, the electronic device 100 may deactivate a display region other than the display region assigned to the user who currently uses the electronic device 100. In this instance, the deactivation may include operations such as stopping of reproducing contents, i.e., a video, changing the display attributes of the screen, or reducing the size of a different display region, or the like.

In another example, when only one user uses the electronic device 100 in the divided screen mode, the authority to control the plurality of display regions may be provided to the user who currently uses the electronic device 100. Accordingly, one user can control all the display regions.

In this instance, the electronic device 100 may give only a portion of the control rights with respect to a different display region, which was not assigned to the user, to the one user who uses the electronic device 100. For example, the electronic device 100 may permit limited control rights such that the user may control the volume with respect to the contents provided in a display region other than the display region assigned to the user but cannot terminate the contents.

In detail, in a state in which only one user uses the electronic device 100 in the divided screen mode, when a first pre-set time lapses, the electronic device 100 may give the authority to control the display region, not assigned to the user, to the remaining user, and then when a pre-set time lapses, the electronic device 100 may give limitless control rights.

In this manner, the electronic device 100 may give the control rights with respect to the display region not assigned to the particular user, and then, when the user who had assigned the display region is returned, the electronic device 100 may deprive of the control rights of the particular user and return the control rights to the returned user.

In embodiments of the invention, the electronic device 100 may determine that a fewer users are currently using the electronic device 100. In this instance, the number of the display regions may be reduced to match the number of the current users. Accordingly, the electronic device 100 need not entirely exit the divided screen mode when a fewer number of users are detected. Rather, the number of the display regions may be reduced to match the number of the current users.

Figure 30:
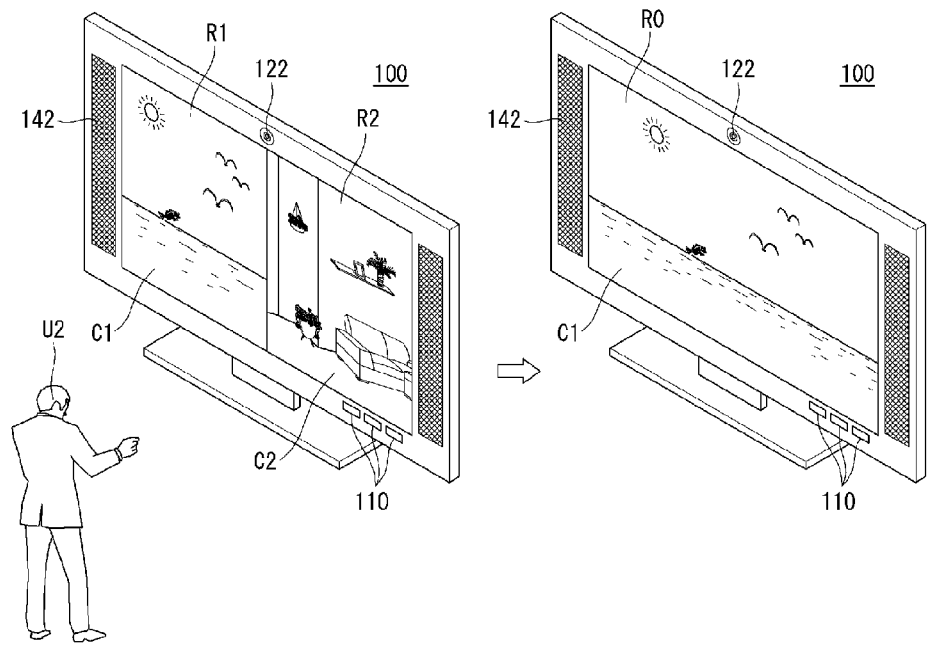
FIG. 30 is a view illustrating contents continuously provided to an entire screen mode in the method for gesture recognition according to the second example embodiment of the invention.

The electronic device 100 may provide contents, being provided to any one of the plurality of display regions, to the entire screen (S230). This operation will be described with reference to FIG. 30. FIG. 30 is a view illustrating contents continuously provided to an entire screen mode in the method for gesture recognition according to the second example embodiment of the invention. When the electronic device 100 enters the entire screen mode in the divided screen mode, contents, being provided to any one of the plurality of display regions, can be provided to the entire screen.

In the method for gesture recognition according to the first example embodiment of the invention, as described above, the electronic device 100 may identify users to discriminate them. When only one user uses the electronic device 100, the controller 170 may identify the user, determine contents being provided to the display region assigned to the user, and provide the contents to the entire screen.

As shown in FIG. 30, while the electronic device 100 provides first contents C1 through the first display region R1 assigned to the first user U1 and second contents C2 through the second display region R2 assigned to the second user U2, when it is determined that only the first user U1 uses the electronic device 100, the controller 170 releases the divided screen mode and returns to the entire screen mode and continuously provide the first contents C1, being provided to the first display region R1 assigned to the first user, to the entire screen.

Figure 31:
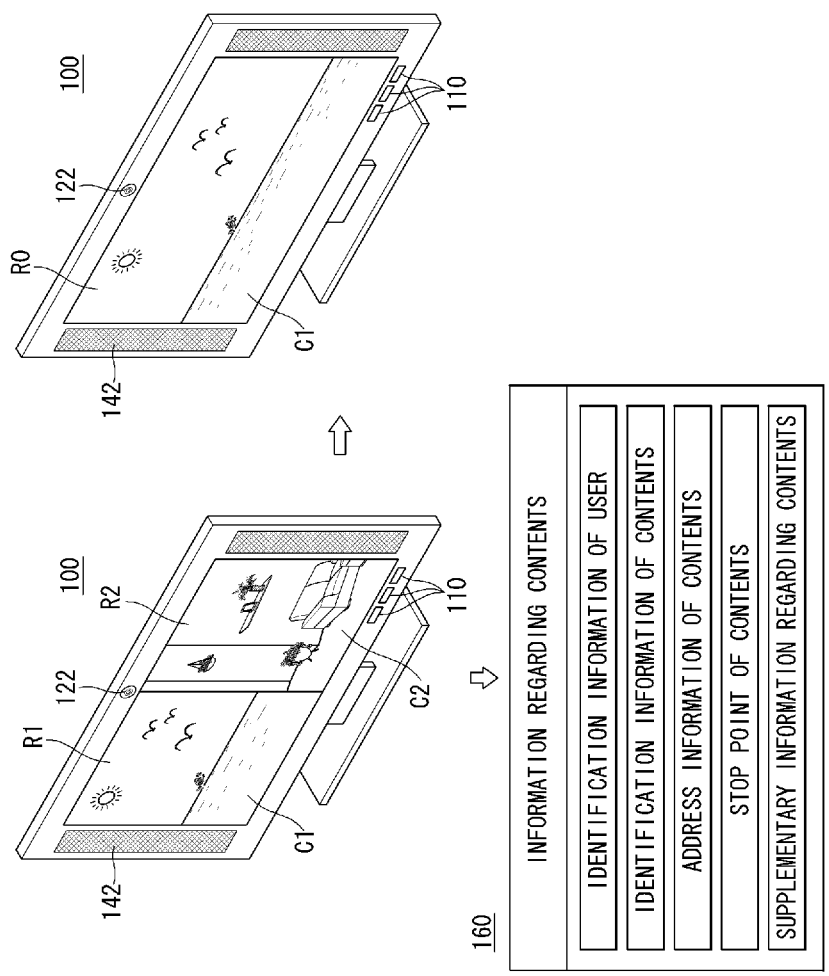
FIG. 31 is a view illustrating information regarding contents stored when entire screen mode is entered in the method for gesture recognition according to the second example embodiment of the invention.

The electronic device 100 may store information regarding contents provided to a different display region among the plurality of display regions (S240). This operation will now be described with reference to FIG. 31. FIG. 31 is a view illustrating information regarding contents stored when entire screen mode is entered in the method for gesture recognition according to the second example embodiment of the invention.

When the electronic device 100 enters the entire screen mode in (or from) the divided screen mode, the controller 170 may store information regarding contents provided in a different display region other than a display region providing contents to be continuously provided to the entire screen mode, among the plurality of display regions, in the storage module 160.

As shown in FIG. 31, in a state in which the electronic device 100 provides first contents through the first display region assigned to the first user and provides second contents through the second display region assigned to the second user, when it is determined that only the first user uses the electronic device 100, the controller 170 may release the divided screen mode to enter the entire screen mode, and store the information regarding the second contents being provided to the second display region assigned to the second user, in the storage module 160.

In this instance, the information regarding the contents stored in the storage module 160 may include at least one of identification information regarding the user who has assigned the display region providing the contents, identification information of the contents, address information of the contents, information regarding a reproduction point in time of the contents, and supplementary information regarding the contents. In this instance, the identification information of the user may be voice feature information or face information for recognizing users, the identification information of the contents may be a title or a channel number of the contents, address information of the contents may be an Internet address, a uniform resource locator (URL), or the like, information regarding a reproduction point in time may be expressed in the unit of time or frame, and the supplementary information may be volume information while the contents is being provided, image control information such as brightness, chroma (or saturation), or the like, information regarding storage point in time, or the like.

Figure 32:
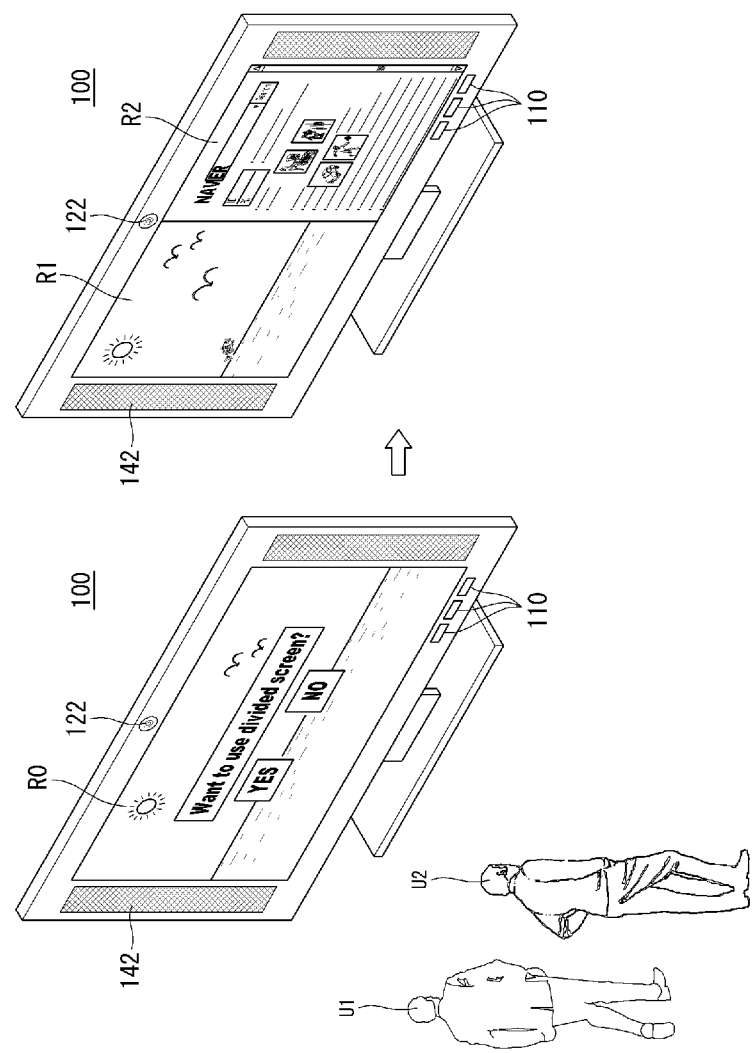
FIG. 32 is a view illustrating an entry to a divided screen mode in the entire screen mode in the method for gesture recognition according to the second example embodiment of the invention.

When a plurality of user are detected in the entire screen mode, the electronic device 100 may enter the divided screen mode (S250). This operation will now be described with reference to FIG. 32. FIG. 32 is a view illustrating an entry to a divided screen mode in the entire screen mode in the method for gesture recognition according to the second example embodiment of the invention.

As described above, the electronic device 100 determines the number of users who uses the electronic device 100, and when a plurality of users uses the electronic device 100 in the entire screen mode, the electronic device 100 electronic device 100 may enter the divided screen mode as shown in FIG. 32.

For example, when a plurality of users use the electronic device 100 within a certain time after the electronic device 100 enters the entire screen mode in the divided screen mode, the controller 170 may enter the divided screen mode again. Conversely, when a certain time lapses after the electronic device 100 has entered the entire screen mode in the divided screen mode, the controller 170 may not enter the divided screen mode although a plurality of users use the electronic device 100.

In another example, the controller 170 may store identification information regarding the plurality of users in the divided screen mode and capture an image through the camera in the entire screen mode. If the image of the camera includes a new user, the controller 170 may analyze the image to determine whether or not the new user is a user who has assigned the display region in the previous divided screen mode. The controller 170 may analyze the image captured in the entire screen mode to obtain identification information of the newly included user, and compare it with the identification information stored in the previous divided screen mode. When the user is determined to be the same, the controller 170 may enter the divided screen mode.

In this instance, as shown in FIG. 32, the controller 170 may output an inquiry regarding re-entry into the divided screen mode to the user through the output module 140, and determine whether to enter the divided screen mode according to a response from the user.

Figure 33:
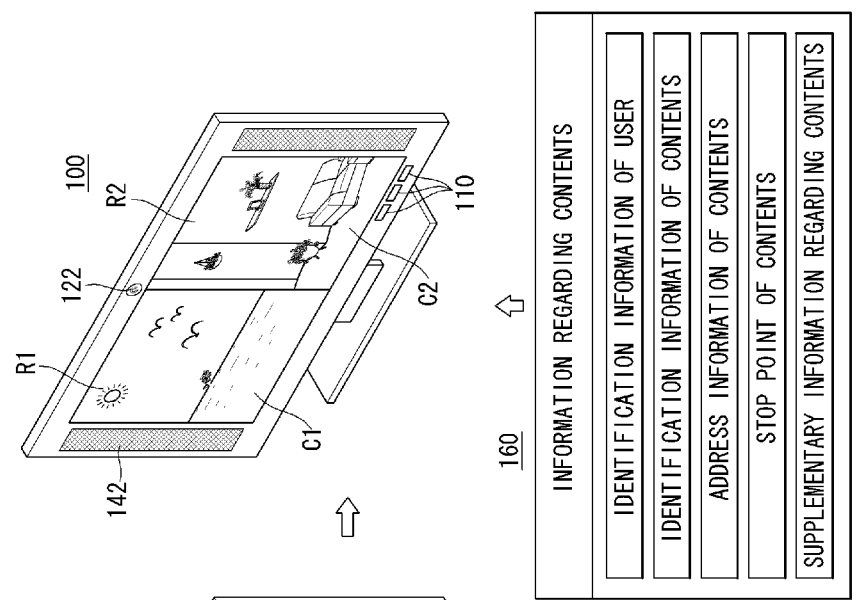
FIG. 33 is a view illustrating contents provided to a plurality of display regions in the divided screen mode in the method for gesture recognition according to the second example embodiment of the invention.
Figure 34:
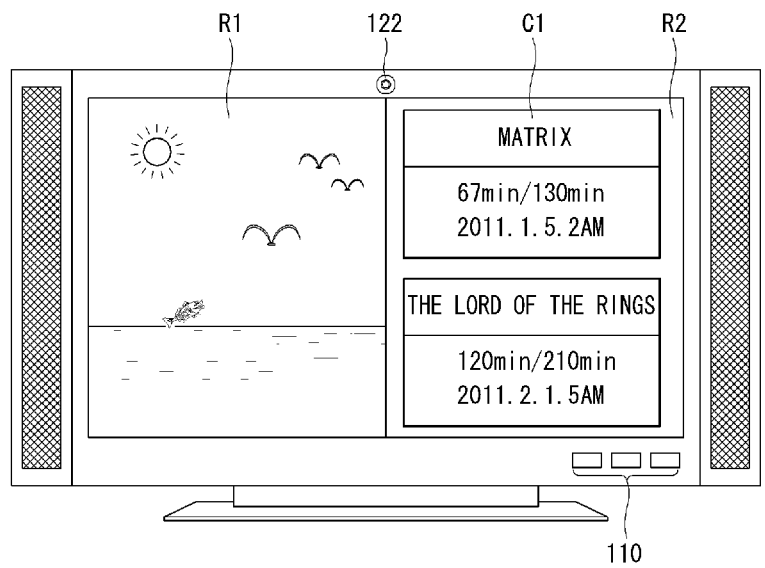
FIG. 34 is a view illustrating a list of contents provided in the divided screen mode in the method for gesture recognition according to the second example embodiment of the invention.

The electronic device 100 may provide contents, which has been provided to the entire screen, and contents according to information regarding stored contents to the plurality of display regions (S260). This operation will now be described with reference to FIGS. 33 and 34. FIG. 33 is a view illustrating contents provided to a plurality of display regions in the divided screen mode in the method for gesture recognition according to the second example embodiment of the invention. FIG. 34 is a view illustrating a list of contents provided in the divided screen mode in the method for gesture recognition according to the second example embodiment of the invention.

When the electronic device 100 enters the divided screen mode in the entire screen mode, the controller 170 may provide contents, which has been provided to the entire screen, to one of the plurality of display regions, and provide contents, which has been provided in the previous divided screen mode to a different display region.

As shown in FIG. 33, entering the divided screen mode, the electronic device 100 may divide the display into the first display region R1 assigned to the first user U1 and the second display region R2 assigned to the second user U2. The controller 170 may continuously provide the contents C1, which has been provided to the entire screen R0, to the first display region R1. Also, the controller 170 may provide the contents C2, which has been provided in the previous divided screen mode, to the second display region R2.

In this instance, the first user may be a user who uses the electronic device 100 in the entire screen mode, and the second user may be a user newly detected in the entire screen mode. The controller 170 may continuously provide the contents, which has been provided to the entire screen, to the display region assigned to the user who has used the entire screen mode and provide the stored contents to a different display region.

The controller 170 may provide different contents to any one of display regions in various manners.

For example, when the electronic device 100 enters the divided screen mode in the entire screen mode, the controller 170 may check whether or not information regarding contents has been stored in the storage module 160. when the information regarding the contents is stored in the storage module 160 when the electronic device 100 enters the divided screen mode in the entire screen mode, the controller 170 may identify contents to be provided to the display region based on identification information of the contents included in the information regarding the contents, and provide the identified contents C2 to one display region R2 as shown in FIG. 33.

Meanwhile, when a plurality of contents has been provided in the previous divided screen mode, the controller 170 may provide at least a portion of the contents through at least a portion of the plurality of display regions in the divided screen mode.

When a plurality of contents has been previously provided, the controller 170 may provide a list of the contents to any one of the display regions. As shown in FIG. 34, the controller 170 may provide at least one of the title CT of the plurality of contents, a reproduction time CR, a screen CS at a reproduction time, and a stop point CP to any one of the plurality of display regions based on the information regarding contents stored in the storage module 160. The controller 170 may provide contents selected by the user from among the plurality of contents through the input module to any one of the display regions.

Alternatively, the controller 170 may select particular contents from among previously provided contents according to users, and provide the particular contents to any one of the plurality of display regions. The storage module 160 stores information regarding previously provided contents, and such information may include information regarding users who used the contents. The controller 170 may identify users through the image captured by the camera, and when an identified user is the same as a user who used the contents among a plurality of contents, the controller 170 may provide the corresponding contents to any one of the plurality of display regions.

In another embodiment of the invention, the controller 170 may provide an item that asks whether previously provided content is the user's, and allows the user to select the previously provided content.

According to the method for gesture recognition according to the second example embodiment of the invention, since the electronic device 100 changes the entire screen mode and the divided screen mode according to the number of the users who use the electronic device 100, it can provide an appropriate display environment to the users.

Also, when a mode is changed (or when there is a change between modes), contents previously used by a user is continuously provided, allowing the user to conveniently use the desired contents.

In the method for gesture recognition according to the invention, the operations constituting each embodiment are not indispensable, but may be selectively included in each embodiment. The operations constituting each embodiment need not to be performed in the described order, and an operation described later may be performed earlier than an operation described first.

Furthermore, in the method for gesture recognition according to the invention, the embodiments may be implemented individually or in combination. The operations constituting each embodiment may be implemented individually or in combination with operations constituting other embodiments.

Furthermore, the method for gesture recognition according to each of the embodiments of the invention may be stored in a computer-readable recording medium in the form of codes or a program for performing the method.

Those having ordinary skill in the art to which the invention pertains may change and modify the invention in various ways without departing from the technical spirit of the invention. Accordingly, the invention is not limited to the above-described embodiments and the accompanying drawings. Further, the embodiments described in the invention should not be construed to be limitative from all aspects, and some of or all the embodiments may be selectively combined in various ways.

The invention claimed is:

1. An electronic device for performing a function based on gesture recognition, the electronic device comprising:
a camera configured to capture an image;
a display; and
a controller configured to:
divide the display into a plurality of display regions, wherein at least two regions among the plurality of display regions are assigned respectively to a plurality of users and at least one common control region among the plurality of display regions is assigned to all users,
recognize gestures performed by the plurality of users based on the image,
control the plurality of display regions respectively assigned to the plurality of users performing the gestures, according to the respective gestures,
control the at least one common control region according to at least one of the all users' gestures to the common control region regardless of regions assigned respectively,
display at least one content on one region of the plurality of display regions,
move at least a portion of the at least one content to an outer side of the one region of the plurality of display regions when receiving a corresponding user's gesture, wherein the at least the portion of the at least one content overlapping with at least one other region of the plurality of display regions is not displayed, and
remove at least one region of the plurality of display regions when a user's gesture corresponding to the at least one region of the plurality of display regions is not received during a pre-set time interval,
wherein the pre-set time interval is determined according to a type of a content displayed on the at least one region.

2. The electronic device of claim 1, wherein the plurality of display regions display at least two different types of content.

3. The electronic device of claim 2, wherein the different types of content include a video signal, a webpage, an image, and an application.

4. The electronic device of claim 1, wherein when a first user chooses a first content, the first content is displayed on an entire display, and when a second user chooses the first content, the first content is displayed on one of the plurality of display regions.

5. The electronic device of claim 1, wherein the controller divides the display into the plurality of display regions one of when a first user chooses to divide the display, when a second user selects a content, when the second user chooses to divide the display prior to selecting the content, and when the second user obtains a control right.

6. The electronic device of claim 1, wherein the controller:
determines locations of the plurality of users based on the image, and
controls locations of the plurality of display regions according to the locations of the plurality of users.

7. The electronic device of claim 1, wherein when a pre-set event is detected while the display provides particular contents by an entire region of the display, the controller divides the display into the plurality of display regions.

8. The electronic device of claim 7, wherein the controller continuously provides the particular contents to anyone of the plurality of display regions.

9. The electronic device of claim 1, wherein the controller displays a plurality of cursors at coordinates corresponding to hands of each of the plurality of users through the display when the coordinates of the cursors are within the display regions assigned to the users corresponding to the cursors.

10. The electronic device of claim 9, wherein when the coordinates of the cursors are outside of the display regions assigned to the users corresponding to the cursors, the controller does not display the cursors or controls display attributes of the cursors.

11. The electronic device of claim 1, wherein the controller identifies one of the plurality of users who has made one of the gestures from the image, and determines a display region assigned to the one user who has made the one gesture based on the identification results.

12. The electronic device of claim 1, wherein when a pre-set event occurs while the display is in a divided state having the plurality of display regions, the controller releases the divided state of the display.

13. The electronic device of claim 12, wherein when the divided state of the display is released, the controller continuously provides contents, being provided to anyone of the plurality of display regions, to an entire screen of the display.

14. The electronic device of claim 13, wherein the pre-set event is a pre-set gesture, and the controller continuously provides the contents, which have been provided to a display region other than one assigned to a user who has made the pre-set gesture, to the entire screen of the display.

15. The electronic device of claim 1, wherein when one user is included in the image captured by the camera while the display is in a divided state having the plurality of display regions, the controller releases the divided state of the display.

16. The electronic device of claim 15, wherein when the divided state of the display is released, the controller provides contents, which have been provided to the display region assigned to the one user included in the image, to an entire screen of the display.

17. The electronic device of claim 16, wherein when the divided state of the display is released, the controller stores the contents which have been provided to a display region other than one assigned to the user included in the image, and when a plurality of users are included in the image, the controller divides again the display into the plurality of display regions and provides the contents, which have been provided to the entire screen, and the stored contents to the plurality of display regions, respectively.

18. The electronic device of claim 1, wherein when only one user is included in the image captured by the camera while the display is in a divided state having the plurality of display regions, the controller changes display attributes of at least one of the plurality of display regions.

19. The electronic device of claim 1, wherein when only one user is included in the image captured by the camera while the display is in a divided state having the plurality of display regions, the controller controls all the plurality of display regions according to the gestures of the one user included in the image.

20. The electronic device of claim 1, wherein the at least one common control region comprises at least one of a volume button, a power button and a specific button able to access a basic function of the electronic device.

21. An electronic device comprising:
a camera;
a display; and
a controller configured to:
divide the display into first and second display regions and a common control region,
recognize gestures of first and second users through the camera,
control first contents displayed on the first display region according to the first user's gesture,
control second contents displayed on the second display region according to the second user's gesture,
control third contents displayed on the common control region according to the first and second users' gestures to the common control region regardless of regions assigned respectively and display at least one of the first, second and third contents not to overlap with at least one other of the first, second and third contents,
display at least one content on the first region,
move at least a portion of the at least one content to an outer side of the first region when receiving a corresponding user's gesture, wherein the at least the portion of the at least one content overlapping with the second region is not displayed, and
remove at least one region between the first and second regions when a user's gesture corresponding to the at least one region is not received during a pre-set time interval,
wherein the pre-set time interval is determined according to a type of a content displayed on the at least one region.

22. A method for performing a function based on gesture recognition, the method comprising:
dividing a display into a plurality of display regions assigned to a plurality of users, respectively and a common control region;
recognizing gestures made by the plurality of users;
controlling the plurality of display regions respectively assigned to the plurality of users according to the respective recognized gestures, the common control region according to all users' gestures to the common control region regardless of regions assigned respectively and displaying at least one content on at least one of the plurality of display regions;
displaying at least one content on one region of the plurality of display regions;
moving at least a portion of the at least one content to an outer side of the one region of the plurality of display regions when receiving a corresponding user's gesture, wherein the at least the portion of the at least one content overlapping with at least one other region of the plurality of display regions is not displayed; and
removing at least one region of the plurality of display regions when a user's gesture corresponding to the at least one of the plurality of display regions is not received during a pre-set time interval,
wherein the pre-set time interval is determined according to a type of a content displayed on the at least one region.

23. The method of claim 22, further comprising:
determining locations of the plurality of users; and
controlling locations of the plurality of display regions according to the locations of the plurality of users.

24. The method of claim 22, wherein, when a pre-set event occurs while particular contents are being provided to an entire screen of the display, the display is divided into the plurality of display regions.

25. The method of claim 24, further comprising:
continuously providing the particular contents to anyone of the plurality of display regions.

26. The method of claim 22, further comprising:
displaying a plurality of cursors at coordinates corresponding to locations of hands of each of the plurality of the users on the display,
wherein the cursors are displayed when the coordinates of the cursors are within the display regions assigned to the users corresponding to the cursors.

27. The method of claim 22, further comprising:
identifying one of the plurality of users who has made one of the gestures; and
determining a display region assigned to the one user who has made the one gesture based on the identification results.

28. The method of claim 22, further comprising:
when a pre-set event occurs while the display is in a divided state having the plurality of display regions, releasing the divided state of the display.

29. The method of claim 28, further comprising:
when the divided state of the display is released, continuously providing contents, which has been provided to anyone of the plurality of display regions, to an entire screen of the display.

30. The method of claim 29, wherein the pre-set event is a pre-set gesture, and the contents continuously provided to the entire screen of the display are contents which were provided to a display region other than one assigned to a user who has made the pre-set gesture.

31. The method of claim 22, further comprising:
capturing an image by the camera; and
when only one user is included in the image captured by the camera while the display is in a divided state having the plurality of display regions, releasing the divided state of the display.

32. A method for gesture recognition, the method comprising:
dividing a display into first and second display regions and a common control region;
recognizing gestures of the first and second users;
controlling first contents displayed on the first display region according to the first user's gesture and controlling second contents displayed on the second display region according to the second user's gesture;
controlling the common control region according to at least one of the first and second users' gestures to the common control region regardless of regions assigned respectively;
displaying at least one content on the first region;
moving at least a portion of the at least one content to an outer side of the first region when receiving a corresponding user's gesture, wherein the at least the portion of the at least one content overlapping with the second region is not displayed; and
removing at least one region between the first and second regions when a user's gesture corresponding to the at least one region is not received during a pre-set time interval,
wherein the pre-set time interval is determined according to a type of a content displayed on the at least one region.

* * * * *